US006702380B2

United States Patent
Bedard

(10) Patent No.: US 6,702,380 B2
(45) Date of Patent: Mar. 9, 2004

(54) UNIVERSAL FLOATATION CHILD SAFETY SEAT

(76) Inventor: Peter Bedard, 290 Drake Ave., New Rochelle, NY (US) 10805

( * ) Notice: Subject to any disclaimer, the term of this patent is extended or adjusted under 35 U.S.C. 154(b) by 0 days.

(21) Appl. No.: 10/188,143

(22) Filed: Jul. 2, 2002

(65) Prior Publication Data

US 2002/0195849 A1 Dec. 26, 2002

Related U.S. Application Data

(63) Continuation-in-part of application No. 09/535,476, filed on Mar. 24, 2000, now Pat. No. 6,412,865, which is a continuation-in-part of application No. 09/167,468, filed on Oct. 7, 1998, now Pat. No. 6,059,360.

(51) Int. Cl.[7] ................................................. A47D 1/10
(52) U.S. Cl. ..................................................... 297/250.1
(58) Field of Search .......................... 297/250.1, 136, 297/256.16; 441/130; 114/363

(56) References Cited

U.S. PATENT DOCUMENTS

| | | | | |
|---|---|---|---|---|
| 3,102,280 A | * | 9/1963 | Williams ..................... | 441/130 |
| 3,620,570 A | * | 11/1971 | Wilson et al. ......... | 297/451.12 |
| 4,500,135 A | * | 2/1985 | Kincheloe .............. | 297/216.11 |
| 4,601,667 A | * | 7/1986 | Hull ........................... | 441/131 |
| 4,627,659 A | * | 12/1986 | Hall ........................... | 297/488 |
| 4,711,490 A | * | 12/1987 | Brand ..................... | 297/250.1 |
| 4,725,253 A | * | 2/1988 | Politte ........................ | 441/130 |
| 4,798,551 A | * | 1/1989 | Dumonceaux et al. ...... | 441/130 |
| 4,799,910 A | * | 1/1989 | Kellough ................... | 441/131 |
| 4,837,869 A | * | 6/1989 | Simmon ........................ | 4/496 |
| 5,005,902 A | * | 4/1991 | Farnworth et al. ....... | 297/250.1 |
| 5,224,891 A | * | 7/1993 | Stephens ................ | 441/130 X |
| 5,514,020 A | * | 5/1996 | Gainforth ................... | 441/126 |

* cited by examiner

*Primary Examiner*—Anthony D. Barfield
(74) *Attorney, Agent, or Firm*—Lackenbach Siegel LLP

(57) ABSTRACT

There is provided a child safety seat and a child safety seat system that are adapted for use in automobiles, watercraft, and/or aircraft. The child safety seat is adapted to float in water such that a child secured in the safety seat is held completely or almost completely above the surface of the water. The child safety seat has a "self-righting" capability such that the seat will turn top-side up in water. The child safety seat has a handle that is integral to the self-righting capability of the child safety seat. In addition, the child safety seat system includes a base that may be used, in particular, in a watercraft and that is adapted to secure the child safety seat such that the child safety seat cannot be shifted horizontally, but can be moved vertically. Alternatively, the base may include a releasable locking assembly, particularly for use in automobiles or aircraft.

15 Claims, 36 Drawing Sheets

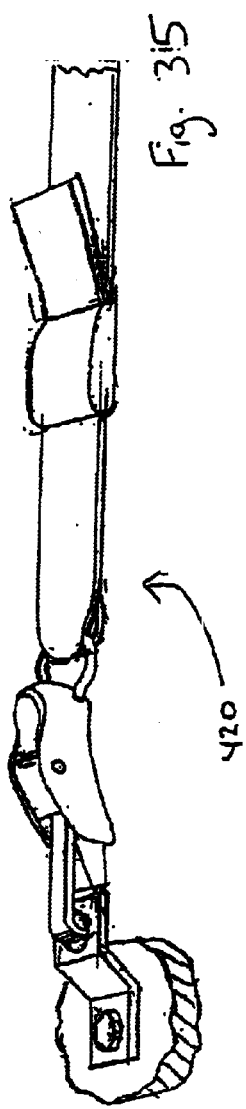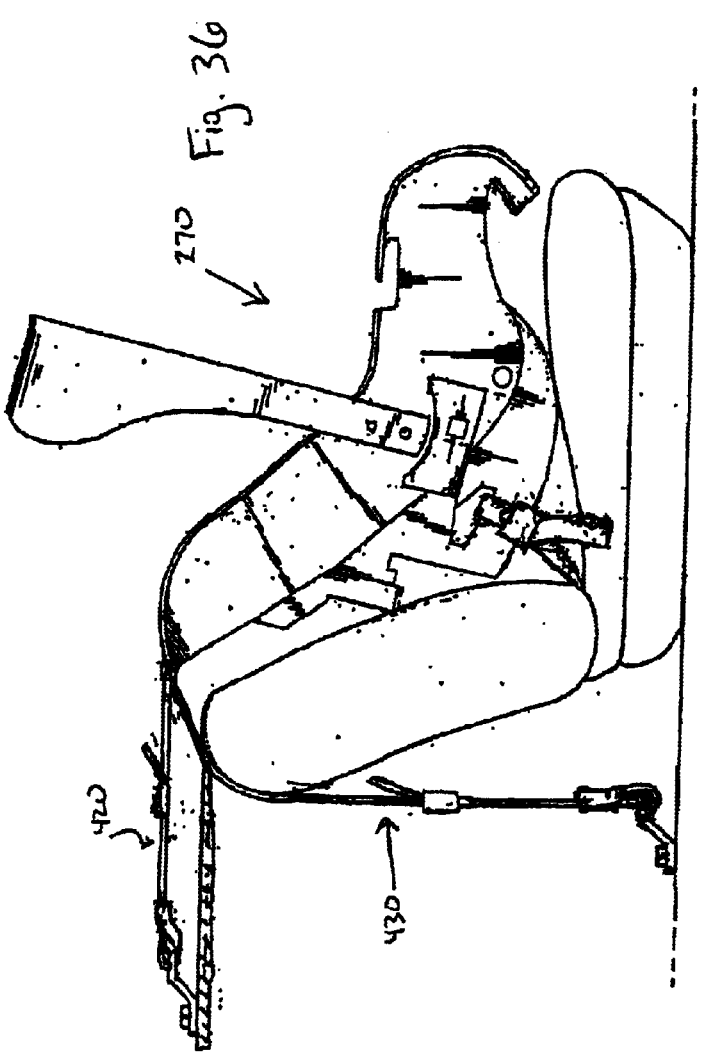

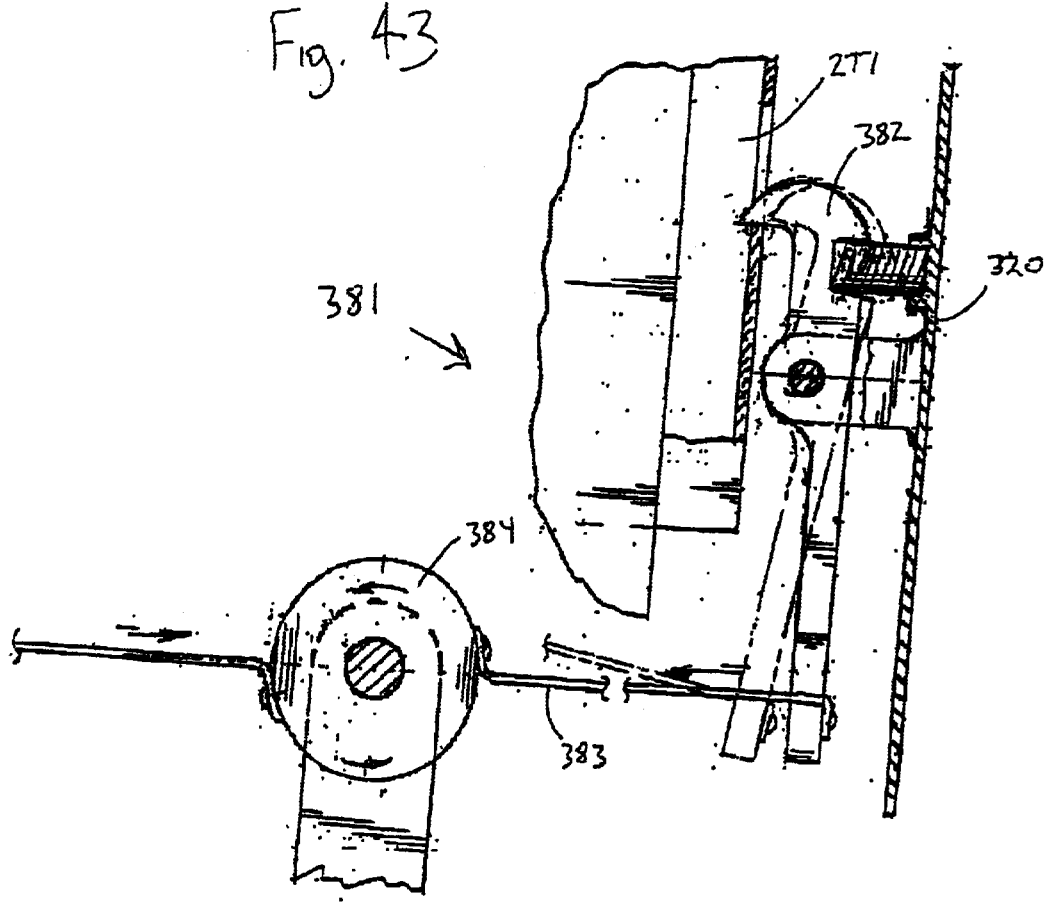

UNIVERSAL FLOATATION CHILD SAFETY SEAT

RELATED APPLICATIONS

The present application is a continuation-in-part application of U.S. patent application Ser. No. 09/535,476, filed on Mar. 24, 2000, now issued U.S. Pat. No. 6,412,865 which is a Continuation-in-Part of U.S. patent application Ser. No. 09/167,468, filed Oct. 7, 1998 (now issued as U.S. Pat. No. 6,059,360 on May 9, 2000).

FIELD OF THE INVENTION

This invention relates to seats for infants and children that may be used in motor vehicles, aircraft, and watercraft. In particular, this invention relates to such seats that secure the infant or child for safety and are also adapted to float upright in the water.

This invention further relates to seating systems for infants and children that may be used in motor vehicles, aircraft, and watercraft. In particular, this invention relates to a seating system that includes the aforementioned floating seat, and a base adapted to accept the seat in such a way that the seat is laterally secured and vertically free.

BACKGROUND OF THE INVENTION

Automotive safety seats are well-known in the art of protection of a child from injury in the event of an impact and are mandated by law. A child automotive safety seat generally includes a rigid bucket seat with various types of protective padding. An undercarriage connected to the bucket safety seat is secured to the motor vehicle by means of straps and quick release buckles connected to the surface of the vehicle. Other straps and quick release buckles connected to the bucket seat hold the child in the safety seat. Such motor vehicle safety seats accommodate a range of ages of young children.

Life preserving devices for infants and young children on water craft are considered by many experts in the field to be only marginally dependable. The smallest life preserver now approved by the U.S. Coast Guard for children over 20 to 22 lbs. is merely a smaller version of the adult life preserver with an extension of the preserver floatation material from the shoulder area to the head area. The purpose of the extension is to provide additional floatation protection for a small child's head so as to keep it above the surface of the water and so protect the child from intake of water. Such a safety device is useful when the child is over 20 to 22 lbs. and can be placed in a standard automotive child safety seat, but an older (over 30 lbs.) or more active child is better cared for in a life jacket.

Complete protection of a child aboard a water craft, such as a motor boat or sail boat, as typical examples, would include both 1) protecting the child from being injured from shock during quick movements of the boat in the case of movements in rough water, and 2) protecting the child from the water in the event of an emergency where the child enters the water, Protection of an adult or a child from quick movements of the boat by various types of shock-absorbing seating devices on the boat including child safety seats are well-known.

Floatable safety seats for a child in a marine environment are known. In particular, such a device is described in U.S. Pat. No. 5,514,020 issued to Gainforth. The Gainforth buoyant child safety seat for boats, however, cannot be transferred to a motor vehicle for the reason that the bottom of the described safety seat is provided with ballast stands with ballast weights that prevent the safety seat from being placed upon and secured to the seat of a motor vehicle. Another floatable safety seat for a child is described in U.S. Pat. No. 4,725,253 issued to Politte. The Politte infant safety flotation seat device cannot be used in a motor vehicle since it cannot be placed upon and secured to the seat of a motor vehicle primarily because of metal weights, or ballast, near the bottom of the safety seat. Child safety seats particularly intended for marine use have been described in prior art, such as in U.S. Pat. Nos. 4,709,648; 4,934,303; 5,119,754; and 5,309,881; but none of the latter describe floatation capability.

Protection of a child from injury during rough water conditions in a marine environment and protection of a child from injury in the event of an impact in a motor vehicle are similar enough that the same shock and cushion protection in accordance with mandated child motor vehicle safety seats will provide a child from sudden movement in a marine environment. Child safety seats for motor vehicles, however, are generally not provided with floatation material or ballast.

Child safety seats presently used for motor vehicles have support structures for the bucket seats and bases for the seats. One type of support structure is a metal frame that includes bars made of a strong metal such as steel that can be hollow tubular bars known in the art of metal structures. My U.S. patent application Ser. No. 09/167,468 entitled "Car/Boat Floatation Seat for Infants" described a child safety seat that is made of such a support structure.

Another type of support structure for child safety seats for motor vehicles that is currently being marketed is made from a strong rigid molded plastic that meets the same safety requirements as metal support structures. The basic design structure of such molded plastic structures vary widely. For example, one such design includes the bucket seat and the support base that rests upon the car seat being integral and secured to the car seat by belt attachment devices between the car structure and the safety seat. Another basic design structure for molded plastic safety seats includes a child bucket seat that is removably secured to a base structure that is secured to the car structure by belt attachment devices so that the bucket seat can be unsnapped from the base structure removed therefrom. Child safety seats made of molded plastic material may not float in water, and may require more floatation material to achieve a high freeboard, which is that distance between the water level and the top of the sidewalls of the child safety seat.

SUMMARY OF THE INVENTION

It is therefore an object of the present invention to provide a child safety seat that is usable both in an automotive environment and in a motor vehicle environment in accordance with mandated child automotive safety seat standards and in a marine environment for shock protection in both environments and for floatation protection of the child after entry into the water in the marine environment.

It is also an object of the present invention to provide a quick release child safety seat for a motor vehicle as mandated by law that is also usable in a marine environment for protection of a child from shock during rough water encounters and for floatation protection of the child in case of an emergency entry into the water. The child safety seat is capable of floating out of the support base in response to a rising water level.

It is a further object of the present invention to provide a safety seat for a child in a marine environment that protects the child from shock during encounters with rough water and also provides floatation protection for the child in the event of an emergency entry into the water, the safety seat also being easily transportable and mountable to a seat or surface of a motor vehicle so that it provides safety protection for the child in accordance with mandated law for child safety seats.

It is therefore an object of the present invention to provide a child safety seat that is usable both in an automotive environment and in a motor vehicle environment in accordance with mandated child automotive safety seat standards and in a marine environment for shock protection in both environments and for floatation protection of the child after entry into the water in the marine environment, the child safety seat being of the type having a support frame made of molded plastic material.

Another object of the present invention is to provide a child safety seat adapted to float in water such that a child secured in the safety seat is held completely or almost completely above the surface out of the water.

Yet another object of the present invention is to provide a child safety seat with a "self-righting" capability such that the seat will turn top side up in water.

In accordance with these and other objects that will become apparent in the course of this disclosure, there is provided a floatable automotive/water craft child safety seat for holding a child weighing generally between birth and 30 or 40 pounds so that the child is protected from injury in the event of sudden movements in both an automotive environment and a marine environment. The floatable child safety seat remains afloat in the water in the event of an emergency on board a water craft so that the head of the child remains above water level. The floatable child safety seat includes a safety seat that meets automotive code requirements for protecting children. The floatable child safety seat includes a support frame holding the safety seat in a generally upright position. The frame also defines a planar surface that is compatible with placing the floatable child safety seat either on the surface of a seat of a motor vehicle or on the surface of a water craft. A floatation structure is secured to the child safety seat so that the child is maintained afloat in water so that the head of the child is positioned above water level. The support frame acts as ballast for maintaining the child safety seat upright in water.

In addition to the steel frame type of child safety seat described in my U.S. patent application Ser. No. 09/167,468, the current molded plastic seat devices that meet the safety standards for infant and child safety seats in motor vehicles are set forth and described herein. Molded plastic seats have a marked advantage over steel frame type safety seats in relation to floatation features in that the plastic is much lighter than steel and in fact in themselves merely submerge in water rather than sink. For this reason, the amount of floatation material that is needed to maintain a molded plastic child safety seat in a floating situation when in water may be much reduced from the floatation material required to maintain a steel frame type safety seat floating in water depending upon the desired amount of freeboard. Specifically, the inventive features that enable child safety seats that meet mandated safety requirements for motor vehicles to be secured to the deck of a boat or other water craft and that remains afloat in the water in the event of an emergency so that the head of the child remains above water level differ from the features described in my U.S. patent application Ser. No. 09/167,468. For example, surfaces are available on the molded plastic child safety seats for placement of floatation material that are not available on metal framed child safety seats.

One embodiment of the present invention set forth herein includes a molded plastic safety seat of the type having a bucket seat unitary with a base structure. Another embodiment of the present invention set forth herein includes such a molded plastic safety seat of the type having a bucket seat that can be detached from the base structure. A large number of various designs of automotive child safety seats are presently being marketed. The two embodiments child molded plastic safety seats described herein are set forth as being merely representative of many designs of child molded plastic car safety seats that can be adapted so as to function as car/boat child floatation seats that meet the legal standards for both automotive and marine environments, so that the inventive features of the present invention described herein can be likewise used for any other type of molded plastic child safety seat.

In addition, the present invention is also intended to meet the requirements for child safety seats for air travel, both for on board flight safety and as floatation devices.

According to a further embodiment of the present invention, there is provided a child safety seat and a child safety seat system that are adapted for use in automobiles, watercraft, and/or aircraft. The child safety seat is adapted to float in water such that a child secured in the safety seat is held completely or almost completely above the surface of the water. The child safety seat has a "self-righting" capability such that the seat will turn top-side up in water. The child safety seat has a handle that is integral to the self-righting capability of the child safety seat. In addition, the child safety seat system includes a support base for use in a watercraft that is adapted to secure the child safety seat such that the child safety seat cannot be shifted horizontally, but can be moved vertically. Another support base is also provided with a releasable locking assembly for use in an automobile.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

BRIEF DESCRIPTION OF THE DRAWINGS

FIG. 35 is a detail view of a safety tether for use with the seat of FIG. 28;

FIG. 36 is a right-side view of the seat of FIG. 27 secured in an automobile seat using a safety belt and two safety tethers;

FIG. 43 is a detail view of a releasable locking assembly useful for securing the floating seat in the base.

DESCRIPTION OF THE PREFERRED EMBODIMENT

Reference is now made in detail to the drawings wherein the same numerals refer to the same or similar elements throughout.

Figure 1:
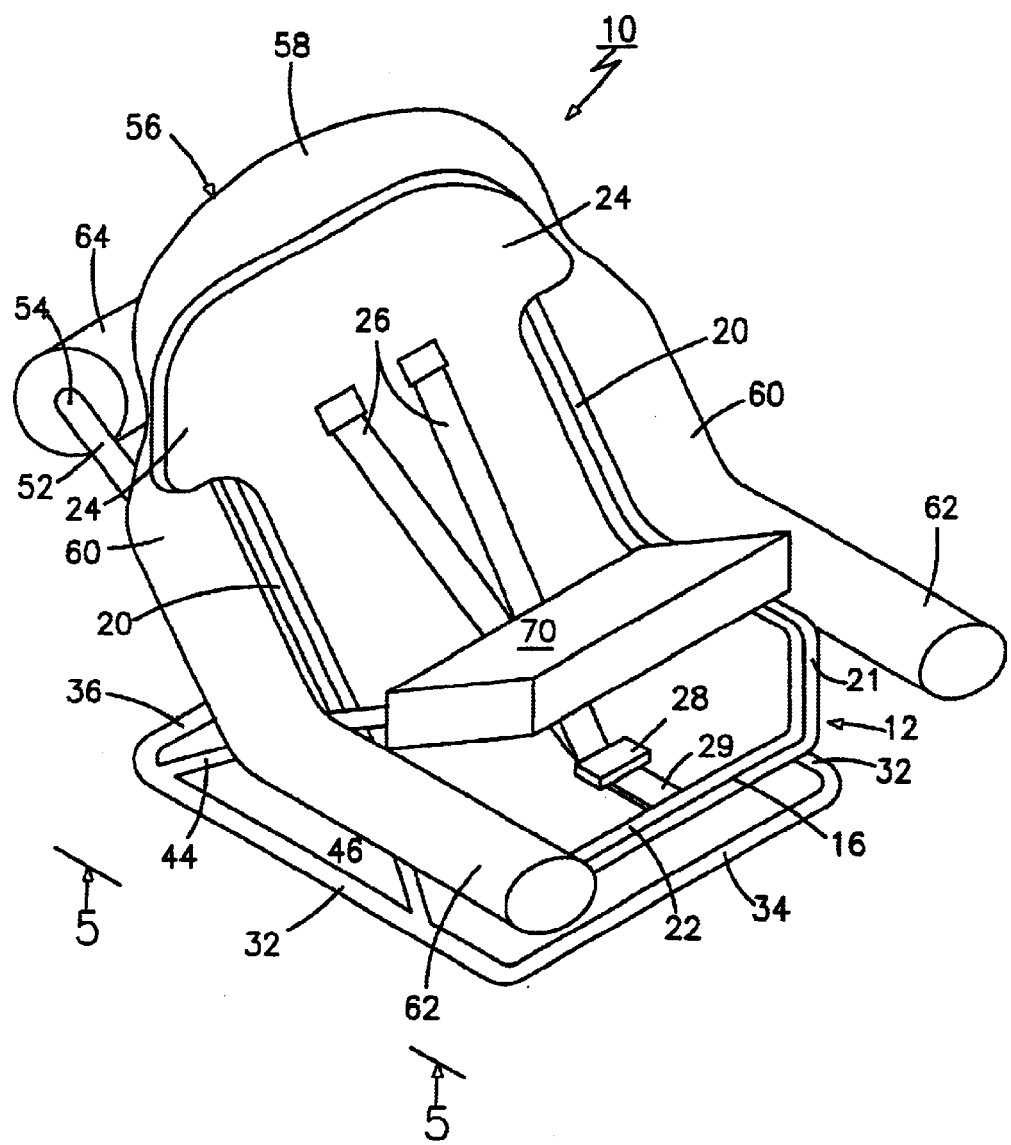
FIG. 1 is a perspective view of the floatable motor vehicle/boat child safety seat with a metal frame.

A floatable motor vehicle/boat child safety seat 10 shown generally in FIG. 1 is usable in both a motor vehicle environment and a marine environment and includes a typical automotive child safety seat 12 that meets the safety requirements for motor vehicles. The automotive child safety seat 12 as shown herein is only one example of a number of designs for child automotive safety seats and is described herein for only for purposes of exposition. Automotive child safety seat 12 includes a rigid bucket seat 14 that comprises a generally horizontal bucket seat bottom wall 16, a seat back wall 18, and opposed bucket seat upper side walls 20 that extend generally laterally from bottom wall 16 and back wall 18 in a downward angled direction parallel to bucket seat back wall 18 and bucket seat lower side walls 21 that extend in a generally horizontal direction parallel to bucket seat bottom wall 16. Back wall 18 is preferably slightly tilted rearward from the vertical. Typical child automotive safety seat 12 also includes a cushion 22 that is contoured to fit over bucket seat 14 and is secured at bottom wall 16, back wall 18 and upper and lower side walls 20 and 21. Cushion 22 also includes head-protective side wings 24 that extend outwardly from back wall 18. Automotive child safety seat 12 is for holding a young child and protecting the child from injury in the event of a sudden movement or collision. Automotive child safety seat 12 also similarly protects a young child from sudden movements in a marine environment. Automotive child safety seat 12 includes a pair of shoulder safety straps 26 secured to cushion 22 and removably connected to a crotch safety buckle 28 in turn secured by a crotch safety strap 29 to cushion 22.

Figure 7:
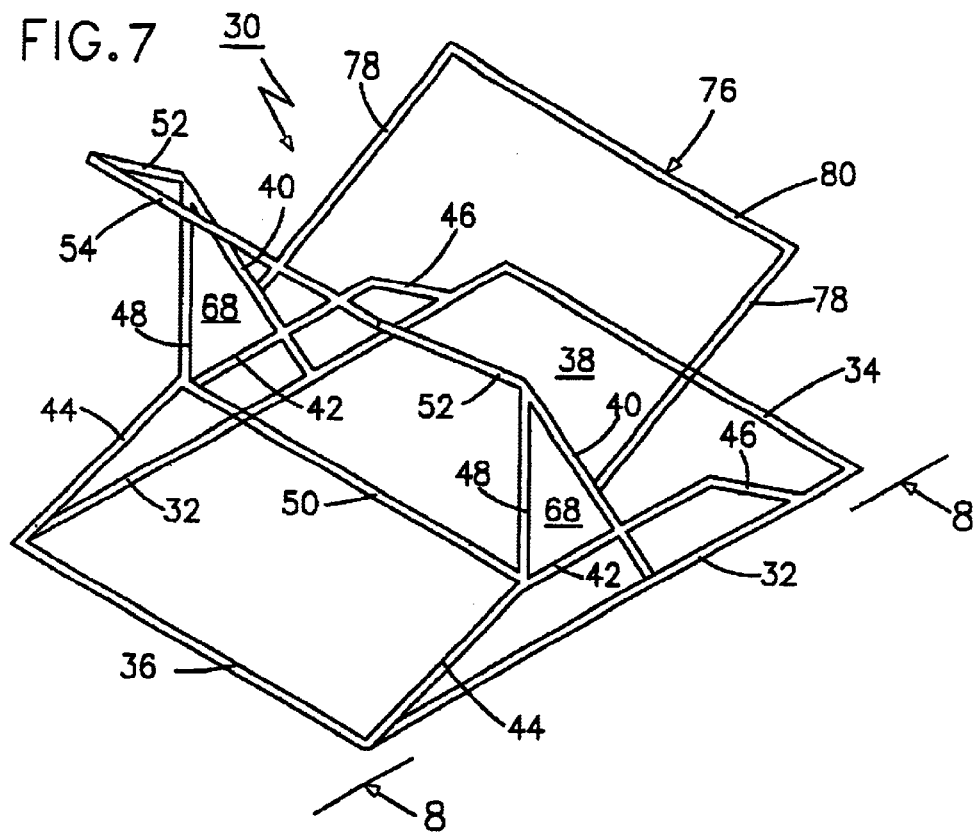
FIG. 7 is a perspective view of the frame/ballast portion of the floatable motor vehicle/boat child safety seat shown in FIG. 1.
Figure 8:
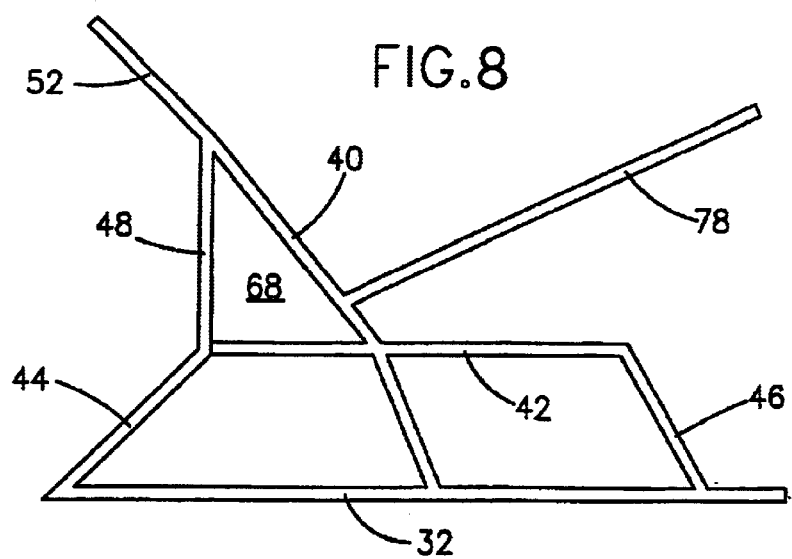
FIG. 8 is a side view taken through plane 8—8 in FIG. 7.

Floatable child safety seat 10 includes a support frame 30 shown in isolation in FIGS. 7 and 8 that is secured in a manner known in the art to child safety seat 12. Support frame 30 includes parallel bottom side support bars 32 and parallel bottom front and rear support bars 34 and 36, respectively, that together define a rectangular planar surface 38 that is compatible with placing support frame 30 along with connected child safety seat 12 on a horizontal surface of a motor vehicle or a water craft.

Support frame 30 includes a pair of rearwardly angled side support bars 40 connected generally midway to bottom side support bars 32. Support frame 30 further includes a pair of parallel upper support side bars 42 that are positioned horizontally and directly above bottom side support bars 32 and that are connected to a pair of parallel forwardly angled rear support bars 44 and a pair of parallel rearwardly angled front support bars 46. Angled rear support bars 44 and angled front support bars 46 in turn are connected to bottom side support bars 32. Angled side support bars 40 are also connected to upper side support bars 42. A pair of parallel vertical parallel support bars 48 are connected to and extend vertically upward from connection to the rear end of upper side support bars 42 and are also connected to the top of angled side support bars 40. A horizontal rear crossbar 50 is positioned forwardly and upwardly from and parallel to bottom rear support bar 36 and is connected to the junctions of upper side support bars 42 and vertical support bars 48. A pair of parallel rearwardly angled upper support bars 52 are connected to the junction of angled side support bars 40 and vertical support bars 48 with the rearward angle being greater than the rearward angle of angled side support bars 40. A horizontal upper rear crossbar 54 parallel to and spaced upwardly from rear crossbar 50 is connected to the upper ends of rearwardly angled upper support bars 52.

Figure 2:
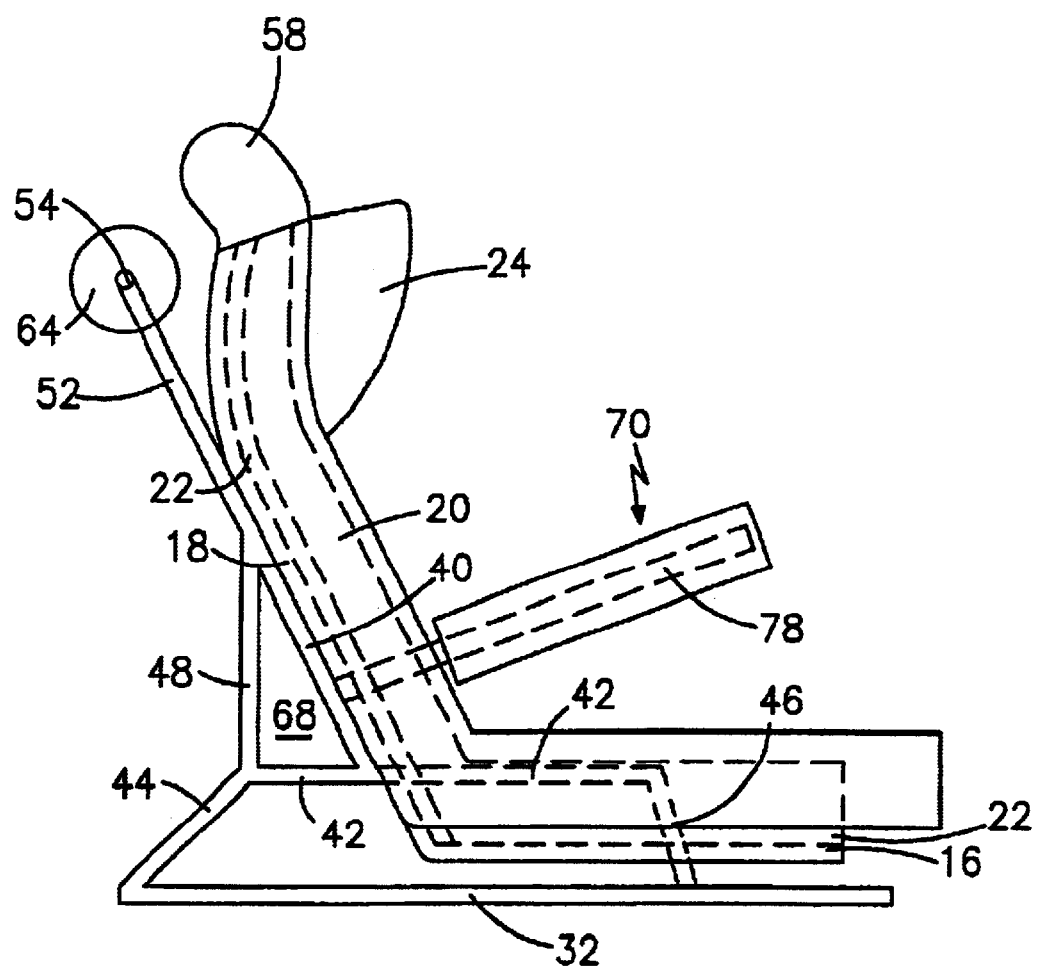
FIG. 2 is a side view taken through plane 2—2 in FIG. 1.
Figure 3:
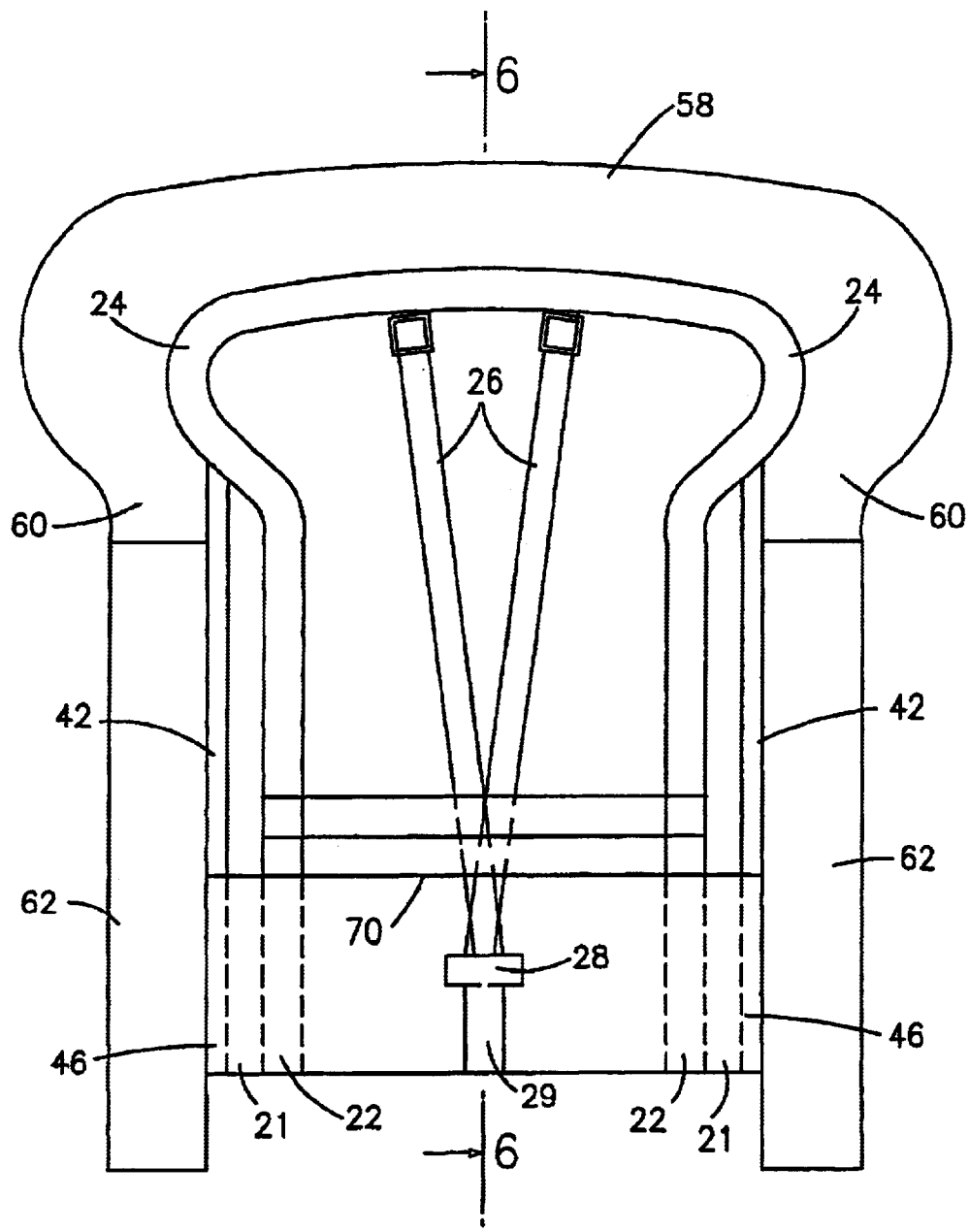
FIG. 3 is a top view taken through plane 3—3 in FIG. 1.
Figure 4:
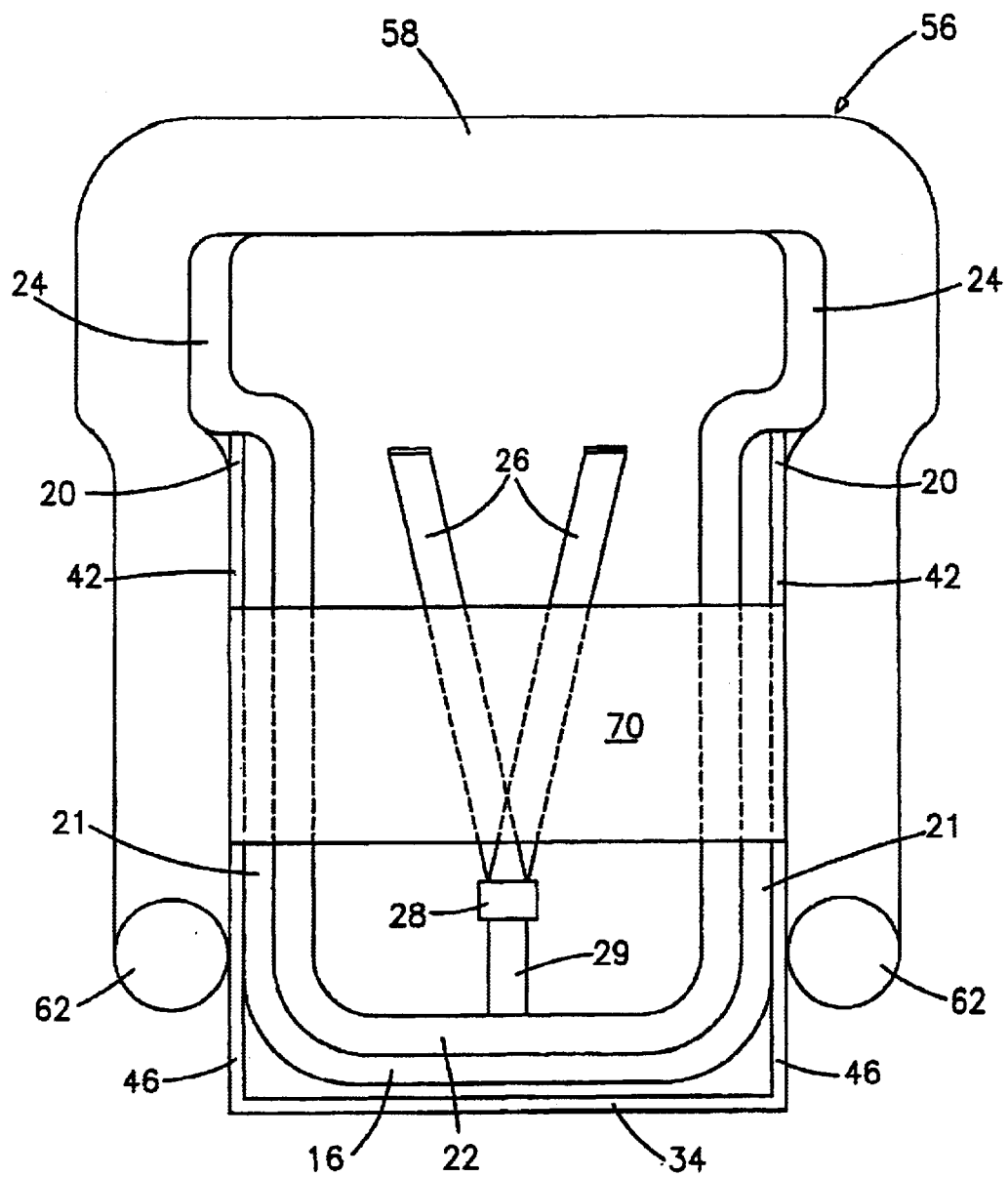
FIG. 4 is front view taken through plane 4—4 in FIG. 1.
Figure 5:
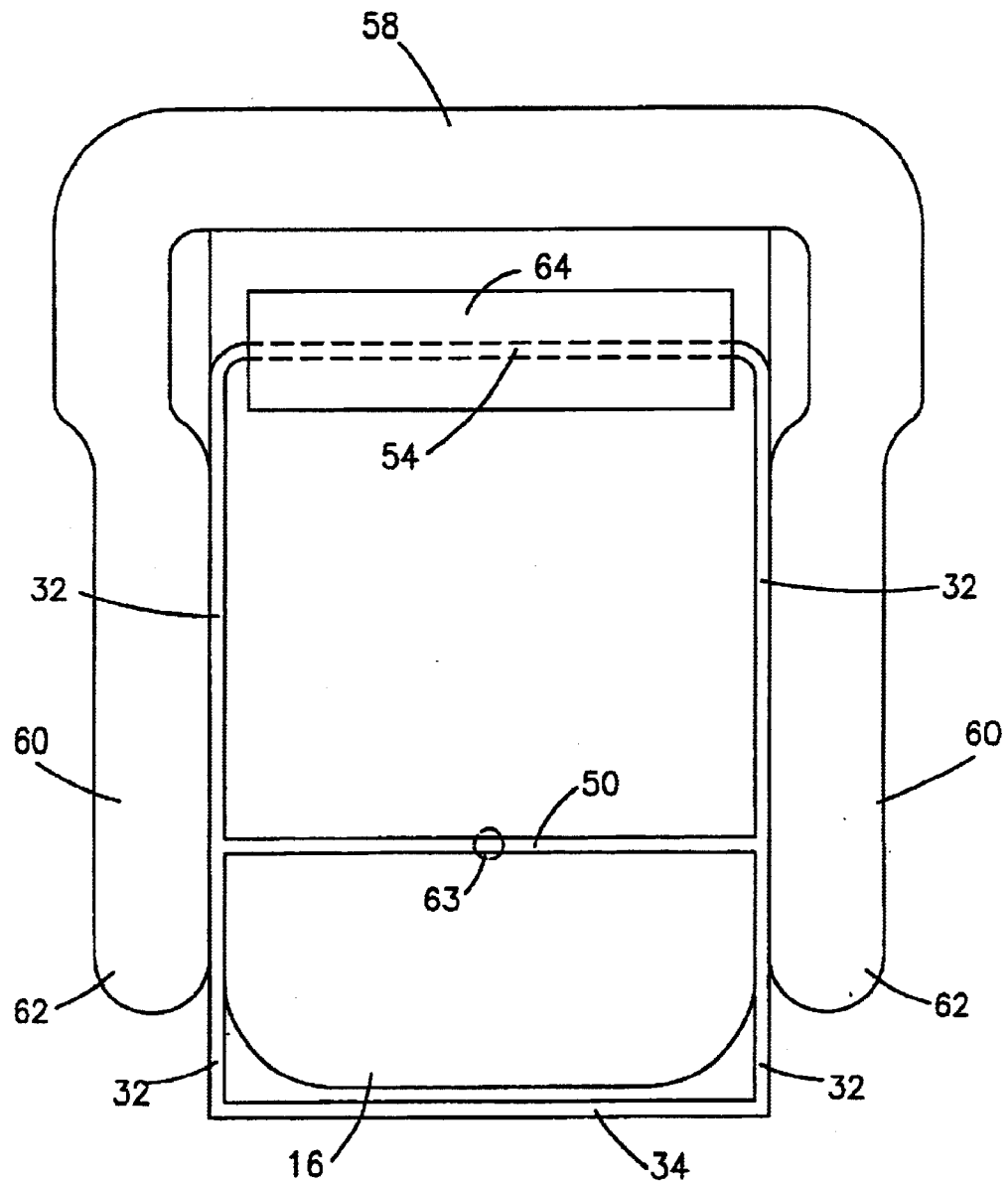
FIG. 5 is a rear view taken through plane 5—5 in FIG. 1.
Figure 6:
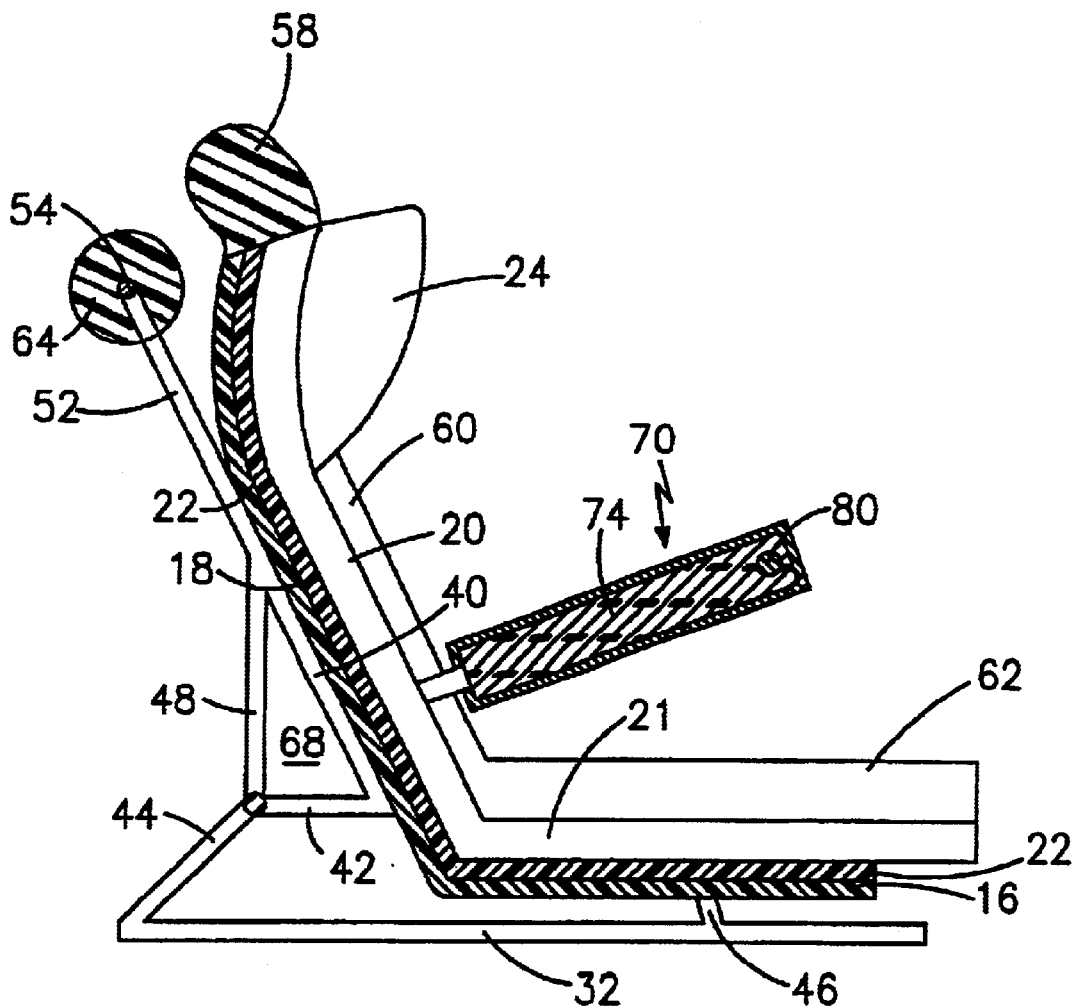
FIG. 6 is a side sectional view taken through line 6—6 in FIG. 3.

As indicated in FIGS. 2 and 6, bucket seat 14 is secured to support frame 30. In particular, back wall 18 is in contact with and secured in a manner known in the art to rearwardly angled side support bars 40. In addition, bucket seat lower side walls 21 are in contact with and secured in a manner known in the art to upper side support bars 42. Bucket seat bottom wall 16 is positioned at the horizontal at a distance above and parallel to planar surface 38.

As shown in FIGS. 1–9 floatable child safety seat 10 includes a unitary generally U-shaped floatation structure 56 made of a material that provides buoyancy in water. Floatation structure 56 includes a floatation top portion 58 positioned generally horizontally along and connected to the top side of bucket seat back wall 18, a pair of downwardly angled floatation side portions 60 secured in a manner known in the art to bucket seat upper side walls 20 and a pair of floatation horizontal side portions 62 secured in a manner known in the art to bucket seat lower side walls 21. Floatation structure 56 is secured to bucket seat 14 directly or is indirectly secured to bucket seat 14 by way of connection to support frame 30. Floatation structure 56 is made of any suitable low density material, such as a low density plastic material, such as a closed cell polyurethane foam material. Floatation structure 56 is particularly situated and positioned so that floatation top portion 58 is spaced rearwardly from the center of gravity 63 (FIGS. 5 and 11) of floatable child safety seat 10 so as to provide an outrigger-type lateral stability to floatable child safety seat 10 in water. Floatation horizontal side portions 62 are equally spaced transversely from the center of gravity 63 so as to provide an outrigger-type lateral stability to floatable child safety seat 10 in water.

Also as shown in FIGS. 1–9, floatable child safety seat 10 further includes a rear cylindrical floatation structure 64 made of a buoyant material that is mounted around horizontal upper crossbar 54. Rear cylindrical floatation structure 64 is spaced farther from bucket seat back wall 18 and from the center of gravity 63 than floatation top portion 58 so as to provide further outrigger-type lateral stability to floatable child safety seat 10 in water.

Floatable child safety seat 10 includes a ballast 66 coextensive with support frame 30 as indicated in FIGS. 1 and 7 for maintaining child safety seat 12 upright and improving the stability of floatable child safety seat 10 in water. Support frame 30 can be made of a solid metal to provide ballast 66. Alternatively, support frame 30 can be made of a tubular metal and filled with metal shot to achieve ballast 66.

Floatable child safety seat 10 includes a ballast suitably disposed below the safety seat's center of gravity, and attached to or cooperatively associated with support frame 30 for maintaining child safety seat 12 upright and improving the stability of floatable child safety seat 10 in water. Support frame 30 as best indicated in FIGS. 7–8 can be made of any type of solid metal to provide ballast. Alternatively, support frame 30 can be made of a tubular metal and filled with metal shot (not shown) to achieve ballast, or, if desired, solid, lead ballast(s) may be secured to one of more of the bottom support bars 32, 34 and 36 or to other sections of the frame.

Floatable child safety seat 10 includes a pair of triangular securing grips 68 defined by pair of angled side support bars 40, pair of upper side support bars 42 and pair of vertical support bars 48 that provide attaching areas for a removable strap or straps known in the art (not shown) that pass through grips 68 and that in turn are attached to the surface of a motor vehicle or water craft so as to restrain the movements of floatable child safety seat 10.

An optional floatable armrest tray 70 shown in FIGS. 1–6 includes an outer protective layer 72 surrounding an inner floatable material 74. Armrest tray 70 is supported by an armrest support frame 76 shown in isolation in FIGS. 7 and 8 that includes a parallel pair of angled slightly upwardly armrest support bars 78 that are each connected at each of their ends to angled side support bars 40. A cross-support bar 80 is in turn connected to each of armrest support bars 78. Armrest support bars 78 and cross-support bar 80 extend through and support inner floatable material 74. Floatable material 74 is made of any suitable low density material, such as a low density plastic material, such as a closed cell polyurethane foam material.

Figure 9:
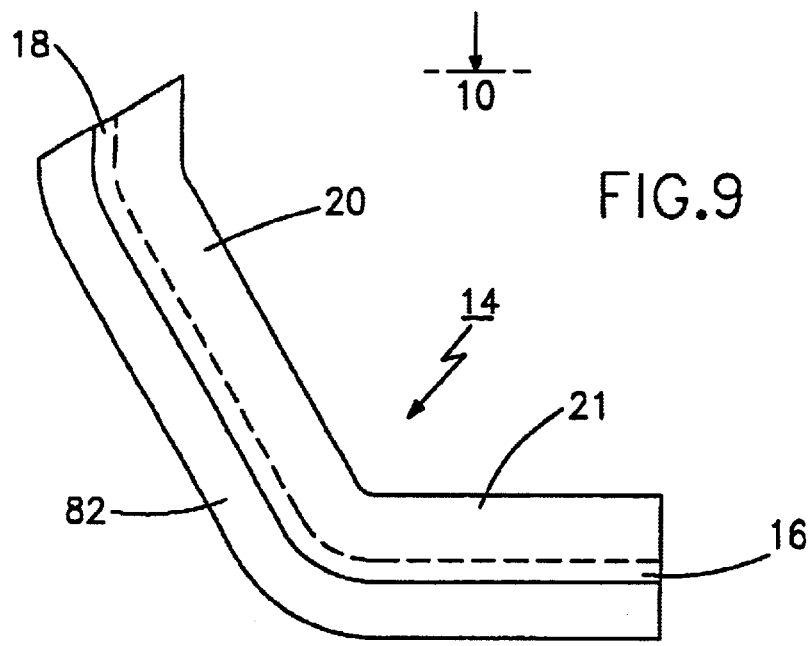
FIG. 9 is a side view taken in isolation of the bucket seat of the floatable motor vehicle/boat child safety seat shown in FIG. 1 with optional floatation material secured to the bottom of the seat.
Figure 10:
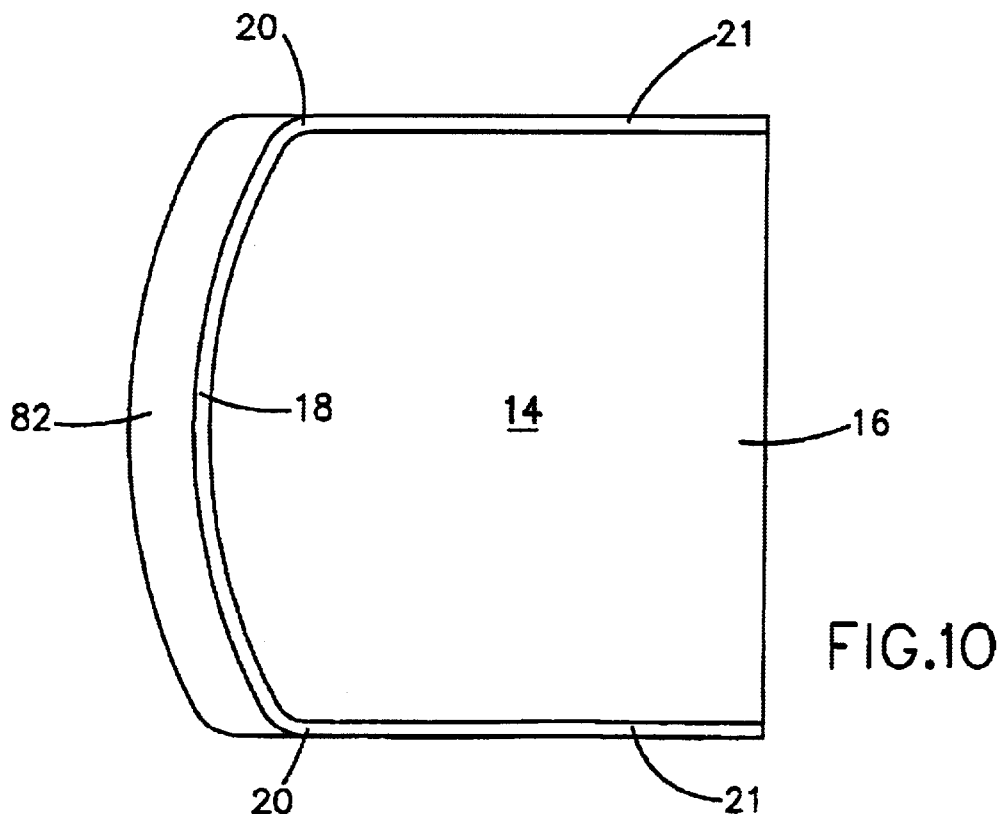
FIG. 10 is a front view of the bucket seat shown in FIG. 9.

FIGS. 9 and 10 show bucket seat 14 with added floatation material 82 affixed in any of various manners known in the art, for example by gluing or by riveting, to the rear side of bucket seat bottom wall 16 and the rear side of bucket seat back wall 18, in order to increase the floatation capacity of floatable child safety seat 10.

Figure 11:
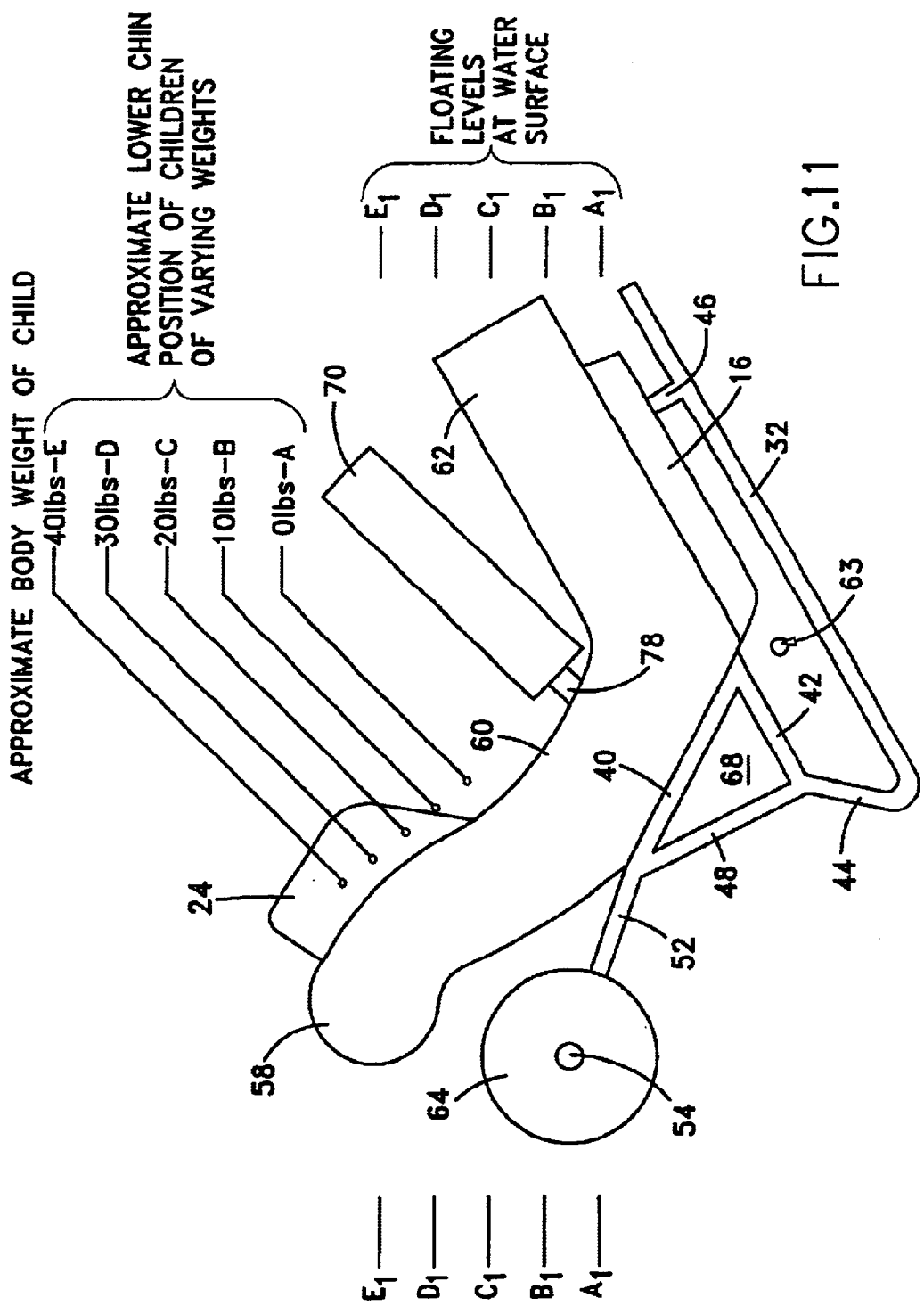
FIG. 11 is a side view of the floatable motor vehicle/boat child safety seat shown in FIG. 1 that indicates generally its position in fresh water while empty and holding children of varying weights.

FIG. 11 indicates various desirable and theoretically achievable positions of floatable child safety seat 10 in water, for purposes of exposition as fresh water, with various levels of immersion relative to the surface of the water in accordance with the body weight of a child therein and with no child. The exemplary body weights of the children are zero (safety seat being empty), 10 pounds, 20 pounds, 30 pounds, and 40 pounds with associated chin levels of A, B, C, D, and E, respectively, relative to water levels shown as A1, B1, C1, D1, and E1, respectively.

Exemplary specifications for floatable child safety seat 10 are as follows:

| Floatable Carrier Dry Weights (in lbs., approximate) | |
| --- | --- |
| Total components dry weight | 12 |
| Molded seat with armrest tray, liner, straps, and buckles | 2 |
| Understructure frame | 9.6 |
| Floatation material | 0.4 |

| Ballast Contributions (in lbs.. approximate) | |
| --- | --- |
| Total components | 9.5 |
| Understructure frame | 9.4 |
| Molded seat, tray shell, straps, etc | 0.1 |

| Floatation Contributions (in lbs., approximate) | |
| --- | --- |
| Total components | 4.1 |
| Low density foam plastics | 40 |
| All other components (negligible) | 1 |

Floatation Distribution (Approximate)

50% forward and 50% aft of center of gravity. Virtually all floatation is at the molded seat compartment perimeter with 40% of all floatation centered within 4 inches of the fore and aft edges of the molded seat compartment.

Floatation Characters and Vertical Distribution (Approximate)

Submerged portions of infant body has natural buoyancy.
(One cc. of water or one cc. of body mass=one gram (Specific Gravity=1.0)

Line A—(safety seat empty), 5,500 or 29% of floatation material submerged, 71% above water level.

Line B—(with 10 pound child, 50% of child submerged), 7,773 c.c.s. or 41% of floatation material submerged, 59% above water level.

Line C—(with 20 pound child, 55% of child submerged), 9,591 c.c.s. or 50% of floatation material submerged, 50% above water level.

Line D—(with 30 pound child, FILL of child submerged), FILL c.c.s. or FILL of floatation material submerged, FILL % above water level.

Line E—(with 40 pound child, 65% of child submerged), 11,864 c.c.s. or 62% of floatation material submerged, 38% above water level.

Figure 12:
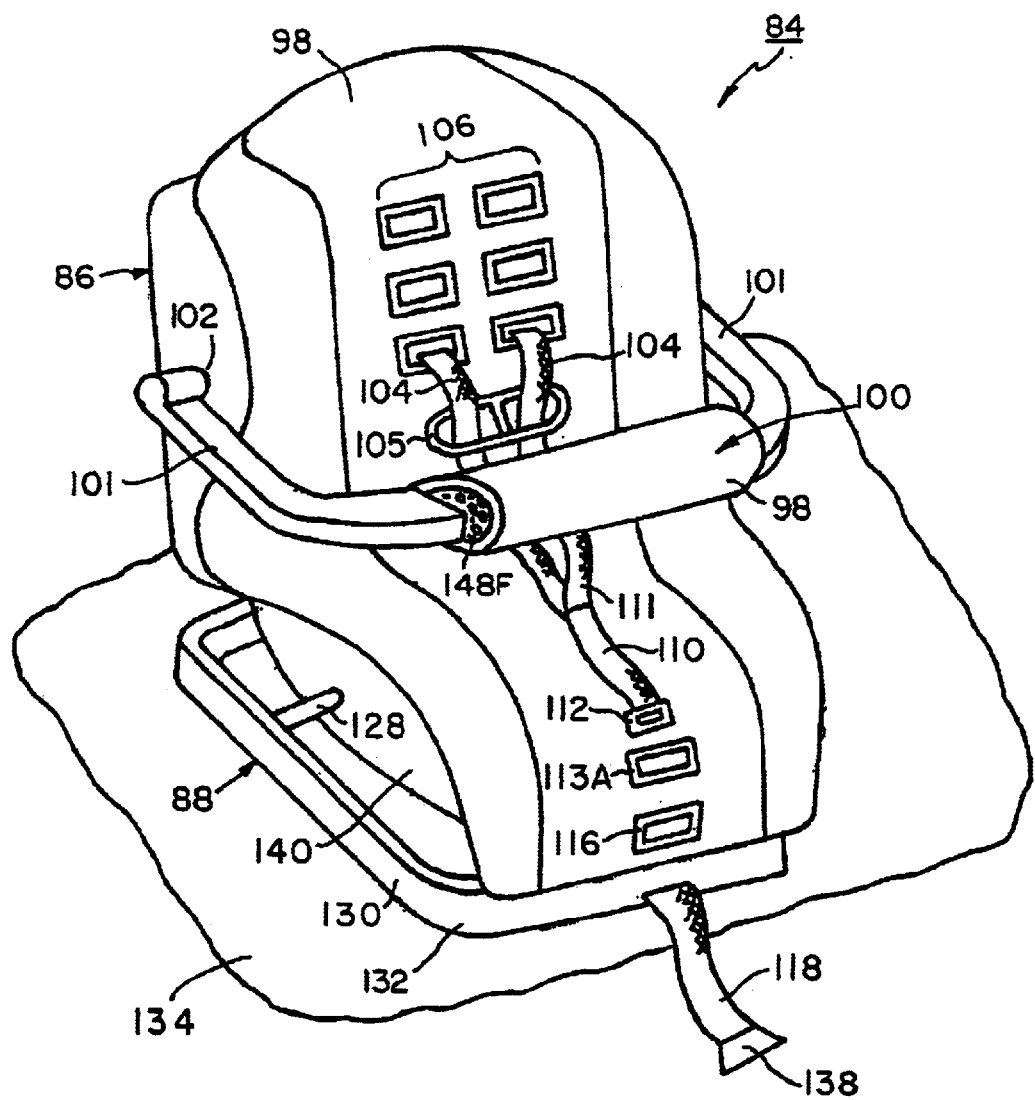
FIG. 12 is perspective view of another embodiment of a floatable motor vehicle/boat child safety seat of the type made of molded plastic frame cradle integral with a molded plastic base and shown with a removable cushion fitted over the cradle.

Another universal floatable child safety seat 84 shown generally in FIG. 12 is usable in a motor vehicle environment, a marine environment and an aircraft environment. Floatable child safety seat 84 includes a typical child safety seat that meets the safety requirements for motor vehicles. The child safety seat 84 as shown herein is merely one example of a number of designs for mostly molded-plastic type automotive child safety seats and is set forth herein only for purposes of exposition.

Figure 13:
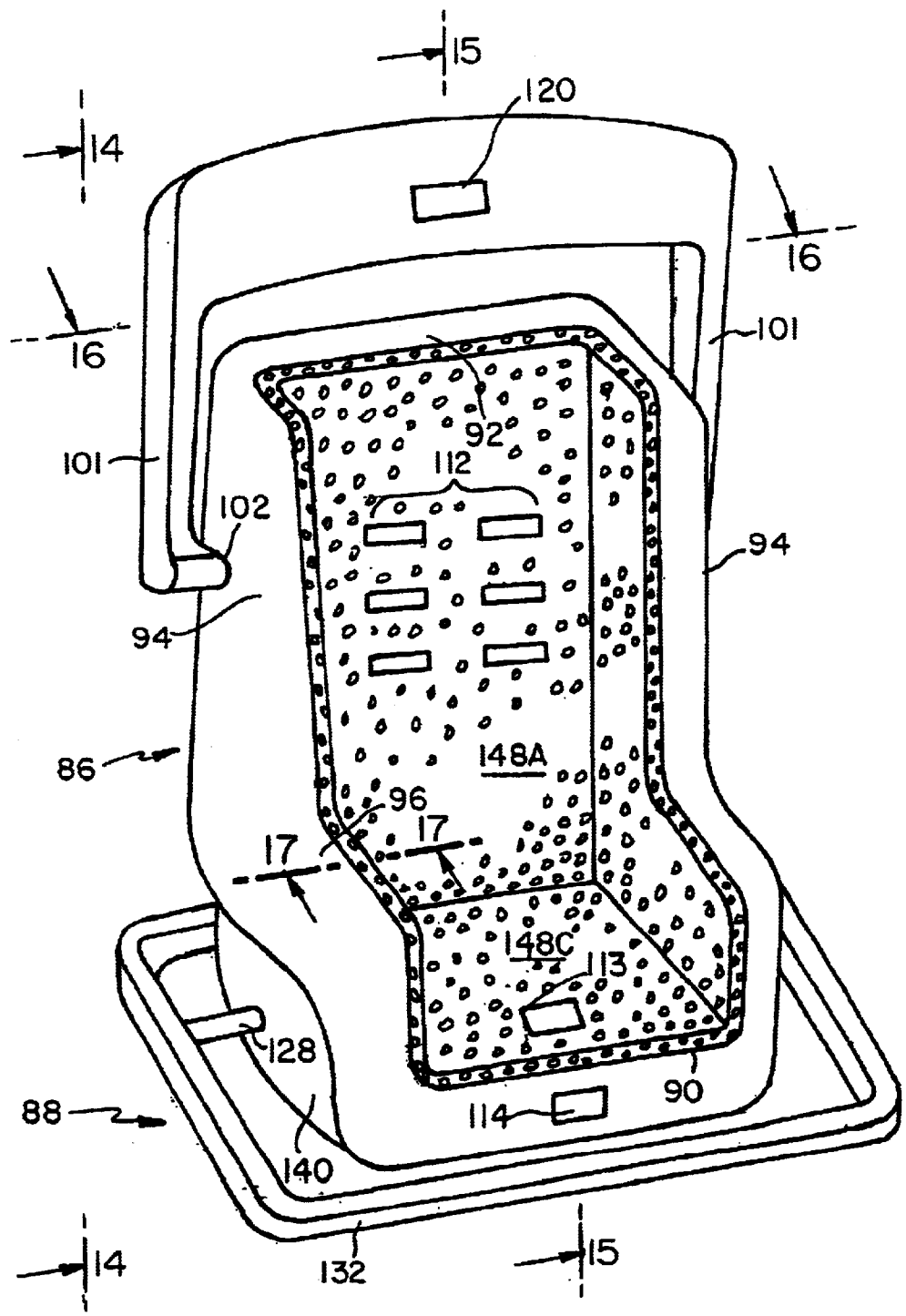
FIG. 13 is a perspective view of the child safety seat shown in FIG. 12 with the cushion and the safety belt removed with the molded plastic frame cradle and the base shown in isolation.

As best seen in FIG. 13, child safety seat 84 includes a rigid molded upright plastic bucket seat, or cradle, 86, and a rectangular base member 88 that is nonremovably secured to cradle 86. Cradle 86 includes a generally horizontal cradle bottom wall 90, a cradle back wall 92 connected to bottom wall 90, opposed cradle upper side walls 94 transversely connected to the sides of back wall 92 and opposed cradle lower side walls 96 continuously connected to upper side walls 94 and which are transversely connected to and extend upwardly from bottom wall 90 in a generally horizontal direction along bottom wall 90. Back wall 92 is slightly tilted rearwardly from the vertical. Typical floatable child safety seat 84 also includes a cushion 98 that is contoured to fit over cradle 86 for protecting a child seated in cradle 86 from injury in combination with cradle 86 in the event of sudden movement or collision. Child safety seat 84 protects a young child from sudden movement both in an automotive and in a marine environment.

Child safety seat 84 includes an optional armrest 100 shown in FIG. 12 in a lowered position to provide an armrest for a child seated in cradle 86. A pair of armrest support bars 101 connect armrest 100 to a pair of opposed horizontally aligned armrest shafts 102 transversely and pivotally mounted to both cradle upper side walls 94. Armrest 100 can be rotated between the lowered position shown in FIG. 12 to a raised position as shown in FIGS. 13, 14, 15 and 16.

Figure 16:
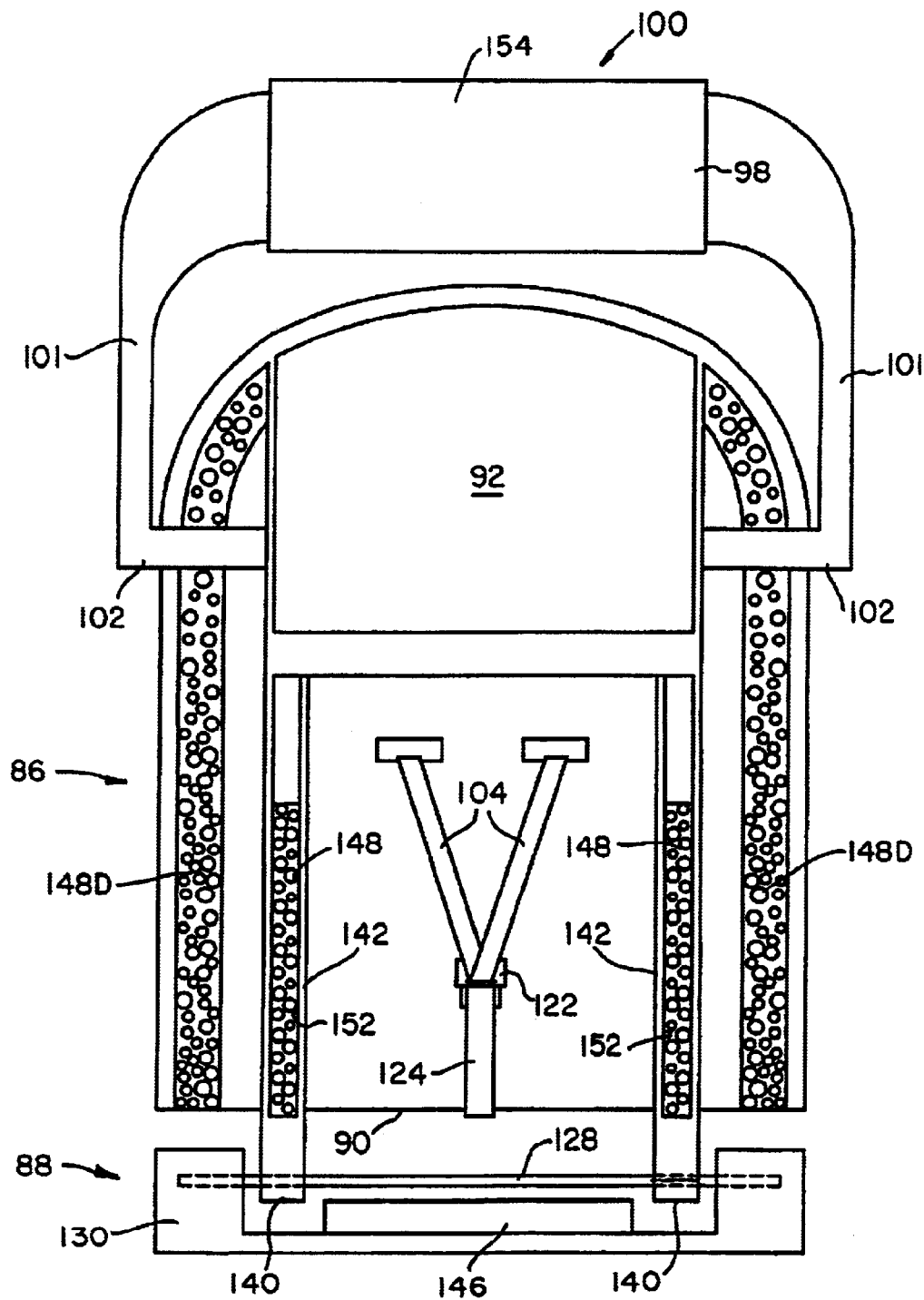
FIG. 16 is a rear elevational view taken through plane 16—16 in FIG. 13.

As shown in FIG. 12, child safety seat 84 includes a pair of shoulder straps 104 to be secured over the shoulders of the child seated in cradle 86. Shoulder straps 104 are passed through one pair of three pairs of cushion apertures 106 shown in FIG. 12 aligned with three pairs of cradle apertures 108 in cradle back wall 92.as shown in FIG. 13. Shoulder straps 104 are connected to a crotch strap 110 that includes one strap portion 111 connected to the underside of armrest 100 and the other end having a crotch strap buckle 112 that can be removably secured to a snap-on connector (not shown) mounted to the top side of base member 88 accessed at connector aperture 113 in bottom wall 90 aligned with cushion aperture 113A. A release mechanism (not shown) for buckle 112 positioned under cradle 86 can be activated by pressure upon a release bar 114 at the front of cradle bottom wall 90 as shown in FIG. 13, which can be accessed through cushion aperture 116. A locking strap 118 is connected to crotch strap 106 as shown in FIG. 12 is removably snap mounted by way of a snap-on buckle (not shown) to a permanent connector 120 located on the underside of armrest 100 shown in FIG. 13. Shoulder straps 104 joined at a rear strap buckle 122 continue to the rear side of cradle back wall 92 as seen in FIG. 16 and then continue as a single connecting strap 124 that extends downwardly along the rear of cradle back wall 92 to the underside of cradle bottom wall 90 and then forwardly between cradle bottom wall 90 and base member 88 and are connected to the front of base member 88 at permanent connector 126 (shown with a portion of connecting strap 124) as seen in FIG. 15.

Figure 14:
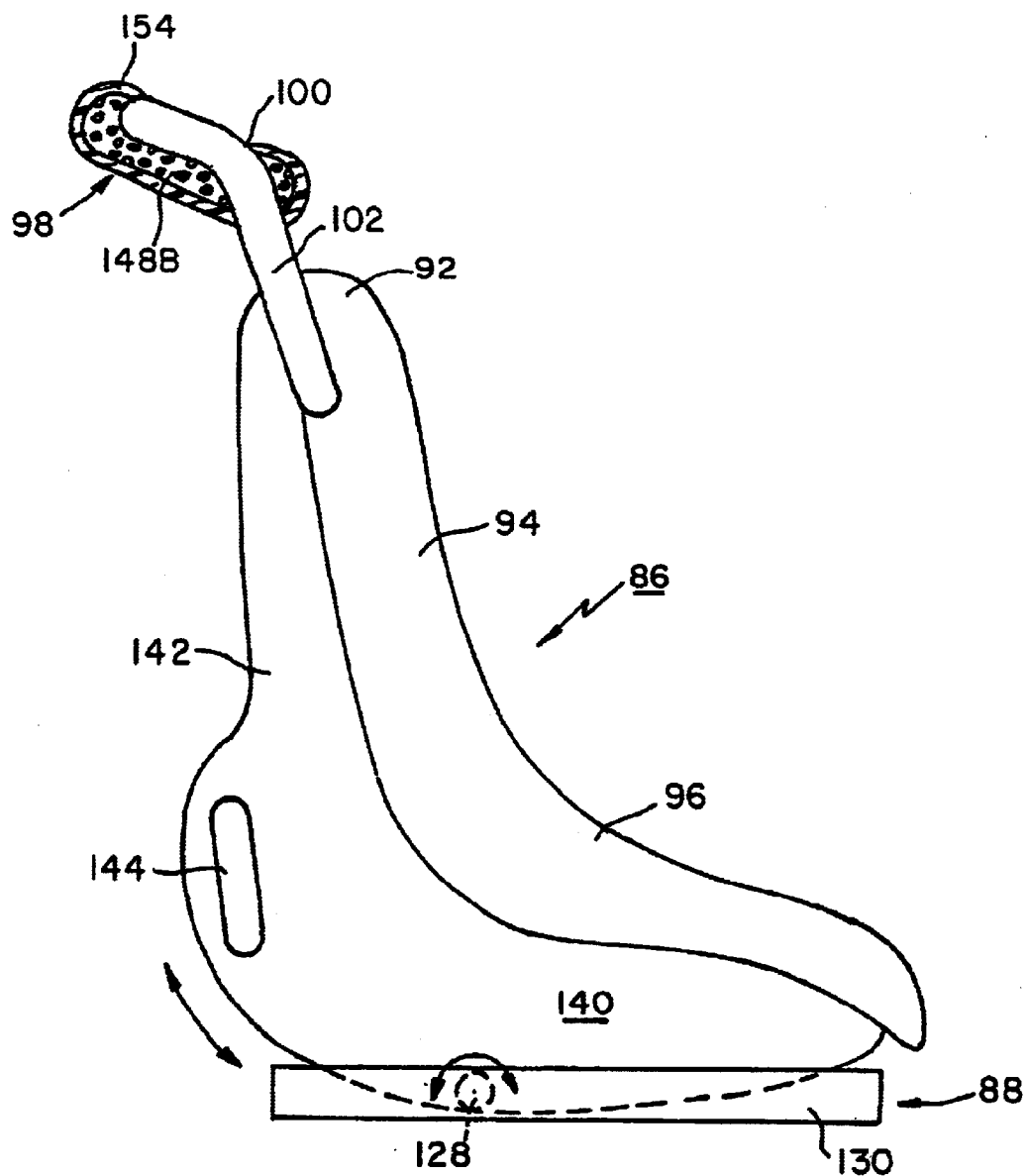
FIG. 14 is a side elevational view taken through plane 14—14 in FIG. 13.
Figures 15, 17:
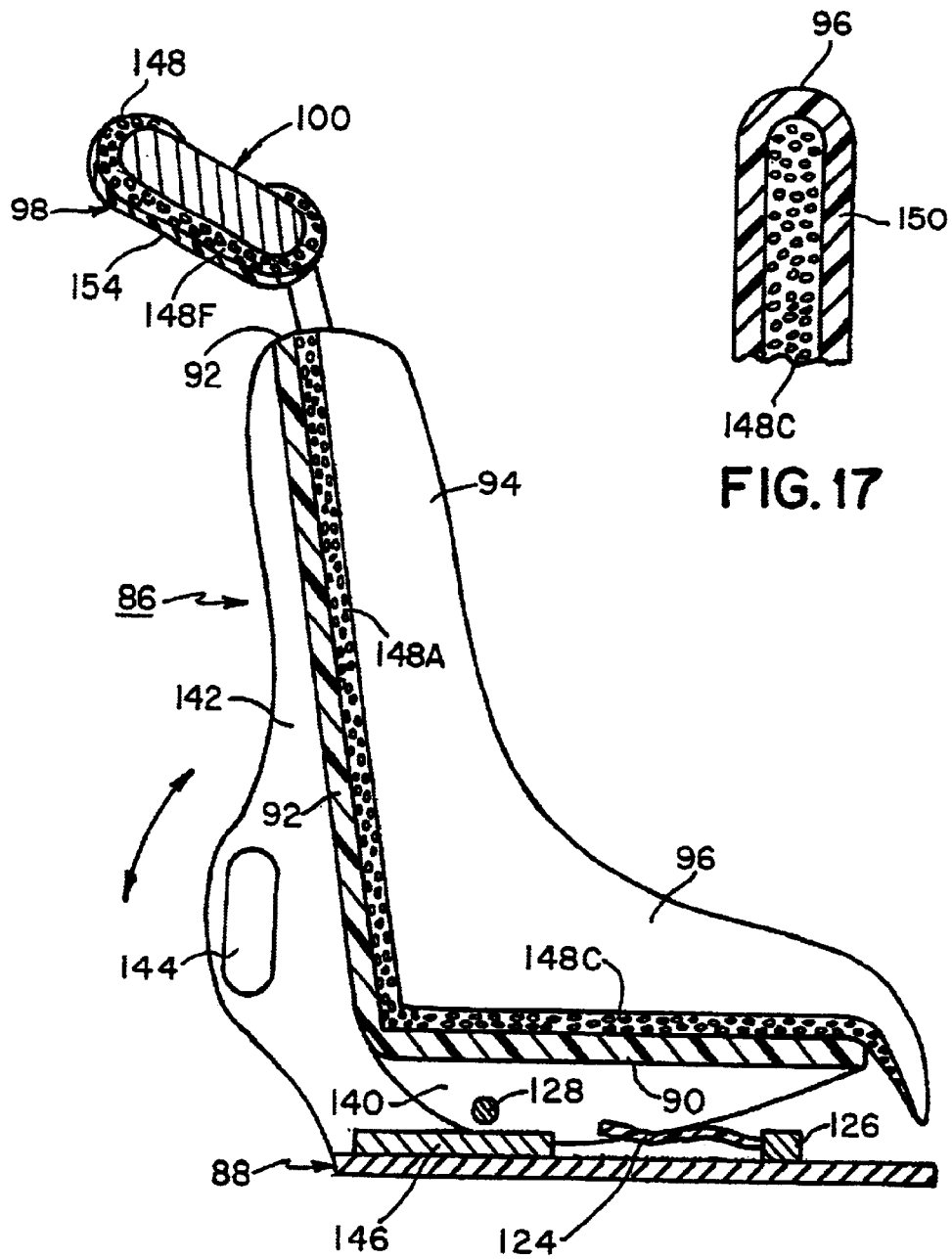
FIG. 15 is a side sectional view taken through plane 15—15 in FIG. 13.
FIG. 17 is a sectional view taken through plane 17—17 in FIG. 13.

Cradle 86 is rotatably mounted on base member 88 by a transverse shaft 128 connected to opposed low upwardly extending side walls 130 of base member 88 as best seen in FIGS. 12, 14 and 15. Base member 88 defines a planar bottom surface 132 best seen in FIG. 15 that is compatible with placing floatable child safety seat 84 either on the surface of a seat of a motor vehicle or on the deck of a water craft or on a seat in the cabin of an aircraft all indicated as surface 134 in FIG. 12. Floatable child safety seat 84 is secured to surface 134 by forward securing strap 118 connected to base member 88 by snap-on connector 138 seen in FIG. 12. Cradle 86 includes a pair of opposed curved side supports 140 that are unitary with cradle bottom wall 90. A pair of vertical structural supports 142 unitary with the rear side of cradle back wall 92 form a pair of elongated apertures 144 through which securing straps (not shown) can be passed and further connected to connectors (not shown) integral with surface 134.

Ballast 146 is connected to child safety seat 84 in order to provide safety seat 84 with a center of gravity in water, and in particular to provide cradle 86 with a center of gravity in water so that a child in cradle 86 that is floating in water is maintained along with cradle 86 in an upright position. Ballast 146 for child safety seat 84 is shown in FIGS. 15 and 16 as a rectangular structure attached in any manner known in the art to the top side of base member 88 at a location at the midportion between cradle side walls 96 and generally under cradle back wall 92. Ballast 146 preferably comprises a non-corrosive material such a non-corrosive metal such as stainless steel. Ballast 146 can also be such material as lead such as molded lead connected in a manner known in the art to any suitable portion of safety seat 84. Lead shot can also be used as a ballast material.

Floatation material referred to generally herein as floatation material 148A–E is secured to various areas of cradle 86 so as to create the buoyancy to float child safety seat 84 in water in arrangement with ballast 146 so that the head of a child positioned in cradle 86 is maintained above water level in combination with the center of gravity created by ballast 146. Floatation material 148A–E is attached to various locations of cradle 86 as shown in FIGS. 15 and 16 as follows: First, floatation material 148A is attached to the inner side of cradle back wall 92. Second, floatation material 148B is attached to the inner portions of cradle upper and lower side walls 94 and 96. Third, floatation material 148C is attached to the top side of cradle bottom wall 90. Fourth, floatation material 148D is positioned in upper and lower arm wall cavities 150 defined by cradle upper and lower molded side walls 94 and 96 as shown in FIGS. 16 and 17 with FIG. 17 being representative of both upper and lower side walls 94 and 96 mutatis mutandis. Fifth, floatation material 148E is positioned in a pair of vertical recesses 152 formed by buttresses 142. Sixth, armrest 100 is enclosed by floatation material 148F that is in turn enclosed by a protective layer 154.

Floatation material 148A–E is a buoyant material, which is preferably a low density material. One such low density material is a closed cell polyurethane. Another such low density material is polystyrene. Various types of buoyant material 148A–E can be used at various locations in accordance with various qualities of the buoyant material.

Buoyancy of cradle 86 can be achieved by molding selected portions of plastic cradle 158 to be hollow and so buoyant. As long as buoyant characteristics of cradle 158 are achieved in arrangement with ballast 214 so as to keep the head of the infant held in cradle 158 above the water line when cradle 158 is in water, the overall inventive aspect of the floatable child safety seat 156 is achieved.

The arrangement of ballast 146 and floatation material 148A–E is to achieve the general results shown in FIG. 11, which indicates various desirable and theoretically achievable positions of floatable child safety seat 10 in water, for purposes of exposition as fresh water, with various levels of immersion relative to the surface of the water in accordance with the body weight of a child therein and with no child. The exemplary body weights of the children are zero (safety seat being empty), 10 pounds, 20 pounds, 30 pounds, and 40 pounds with associated chin levels of A, B, C, D, and E, respectively, relative to water levels shown as A1, B1, C1, D1, and E1, respectively.

Child safety seat 84 is of a type that is appropriate and suitable for accommodation for a child in the general weight range of 40 pounds. Child safety seat 84 can be secured to the base of a motor vehicle such as a seat of a motor vehicle, to the base of a top deck or underdeck in a marine environment, to a seat in a marine environment such as a motor boat, or to any base in an aircraft enviroment including a floor or a seat therein.

Figure 18:
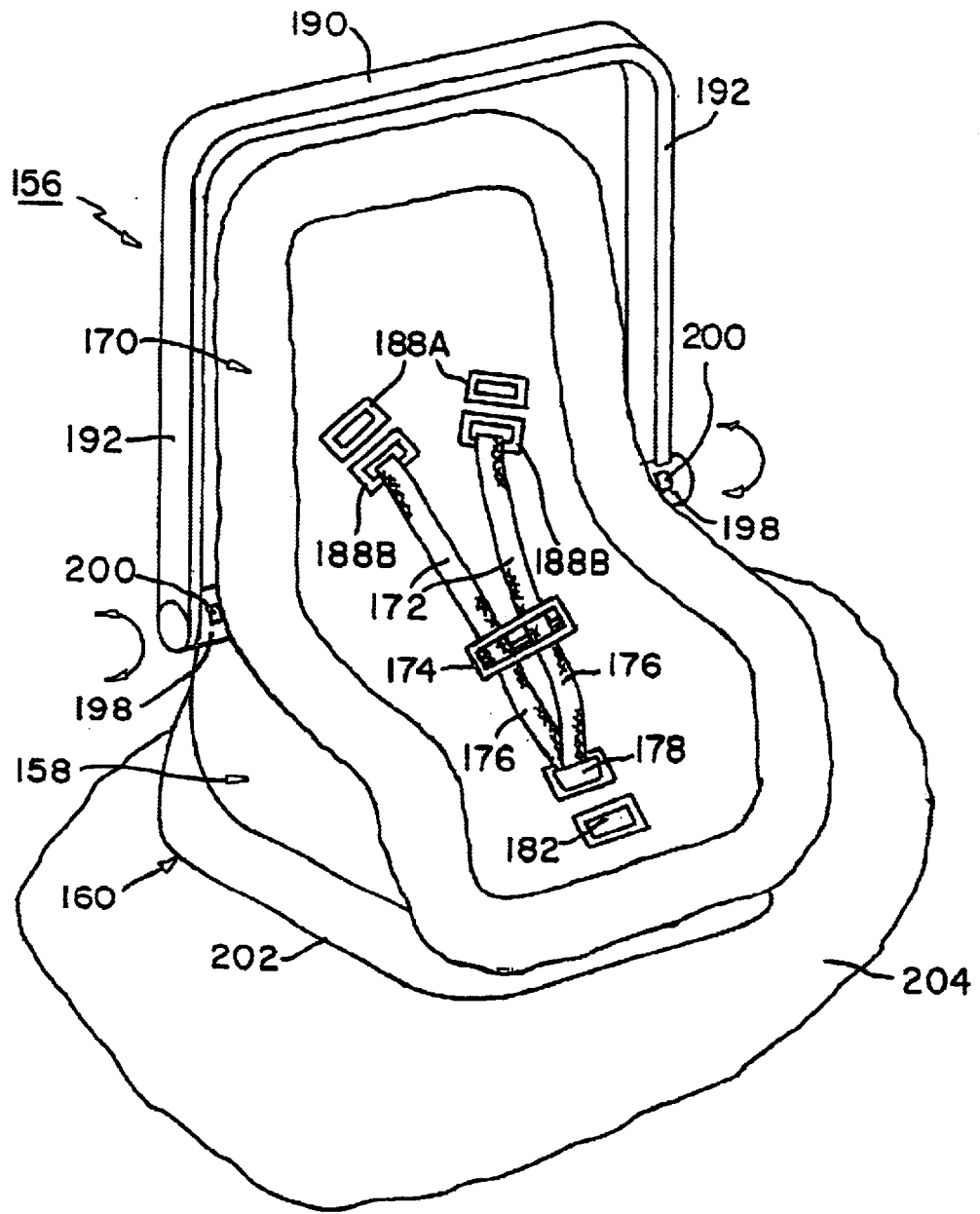
FIG. 18 is a perspective view of another embodiment of a floatable motor vehicle/boat child safety seat of the type made of molded plastic frame cradle removably positioned on a molded plastic base and shown with a removable cushion fitted over the cradle.

Another universal floatable child safety seat 156 shown generally in FIG. 18 is usable in a motor vehicle environment, a marine environment and an aircraft environment and meets the safety requirements for motor vehicles. Child safety seat 156 is appropriate and suitable for accommodation of an infant from birth to a weight of approximately 20 pounds. Child safety seat 156 as shown herein is merely an example of a number of designs for mostly molded-plastic type automotive child safety seats and is set forth herein only for purposes of exposition.

Figure 19:
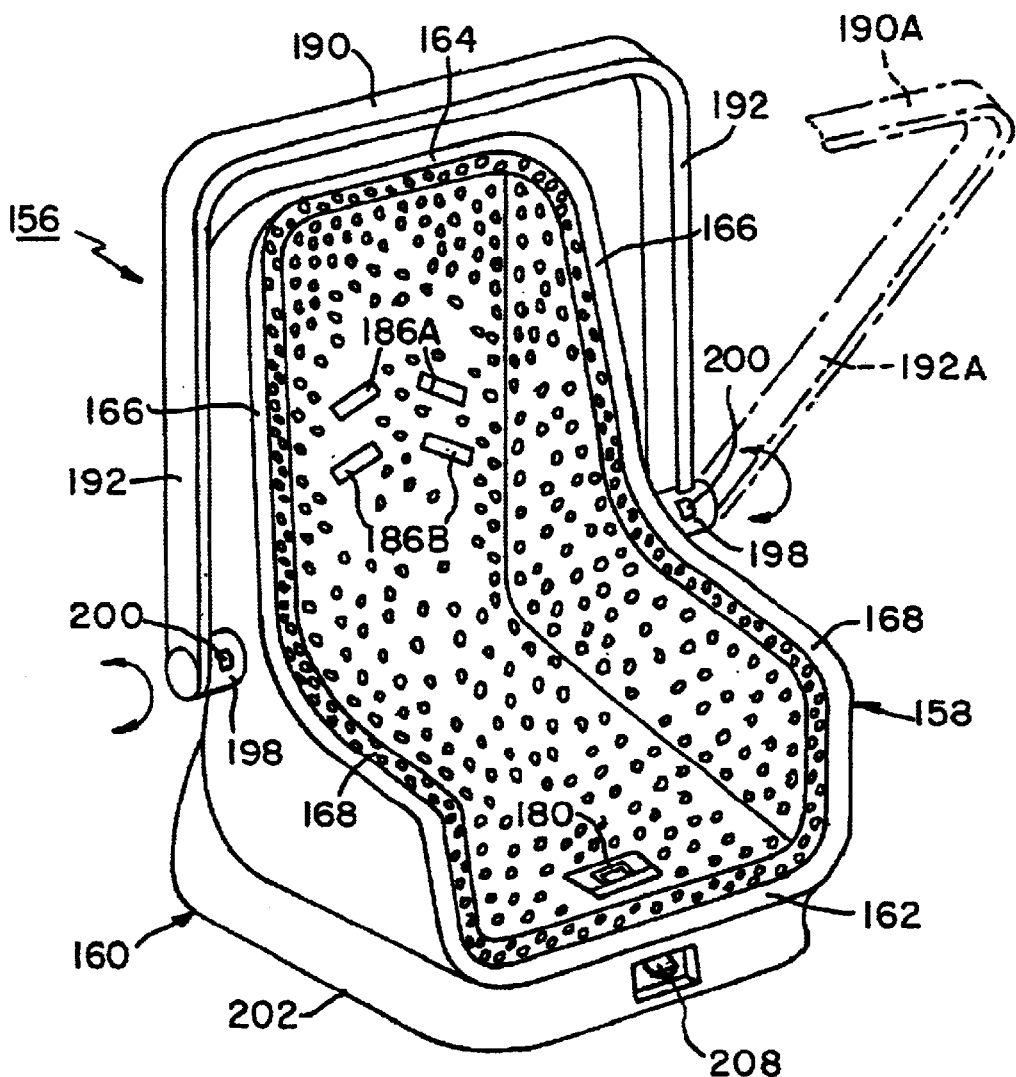
FIG. 19 is a perspective view of the child safety seat shown in FIG. 18 with the cushion removed with the molded plastic frame cradle and the base shown in isolation.
Figure 20:
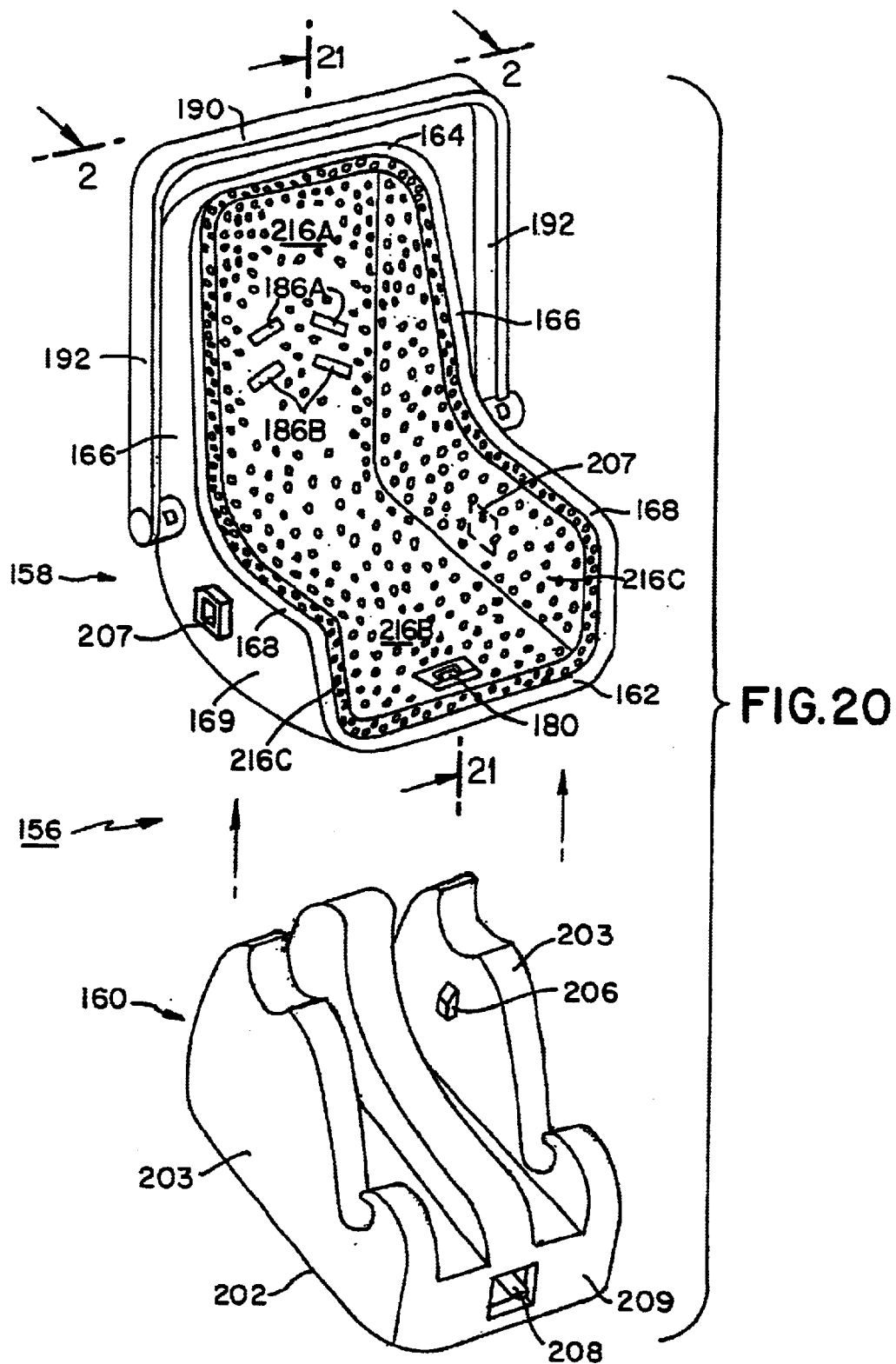
FIG. 20 is a perspective view of the child safety seat as shown in FIG. 19 with the cradle shown as being removed and vertically raised from the base.
Figure 21:
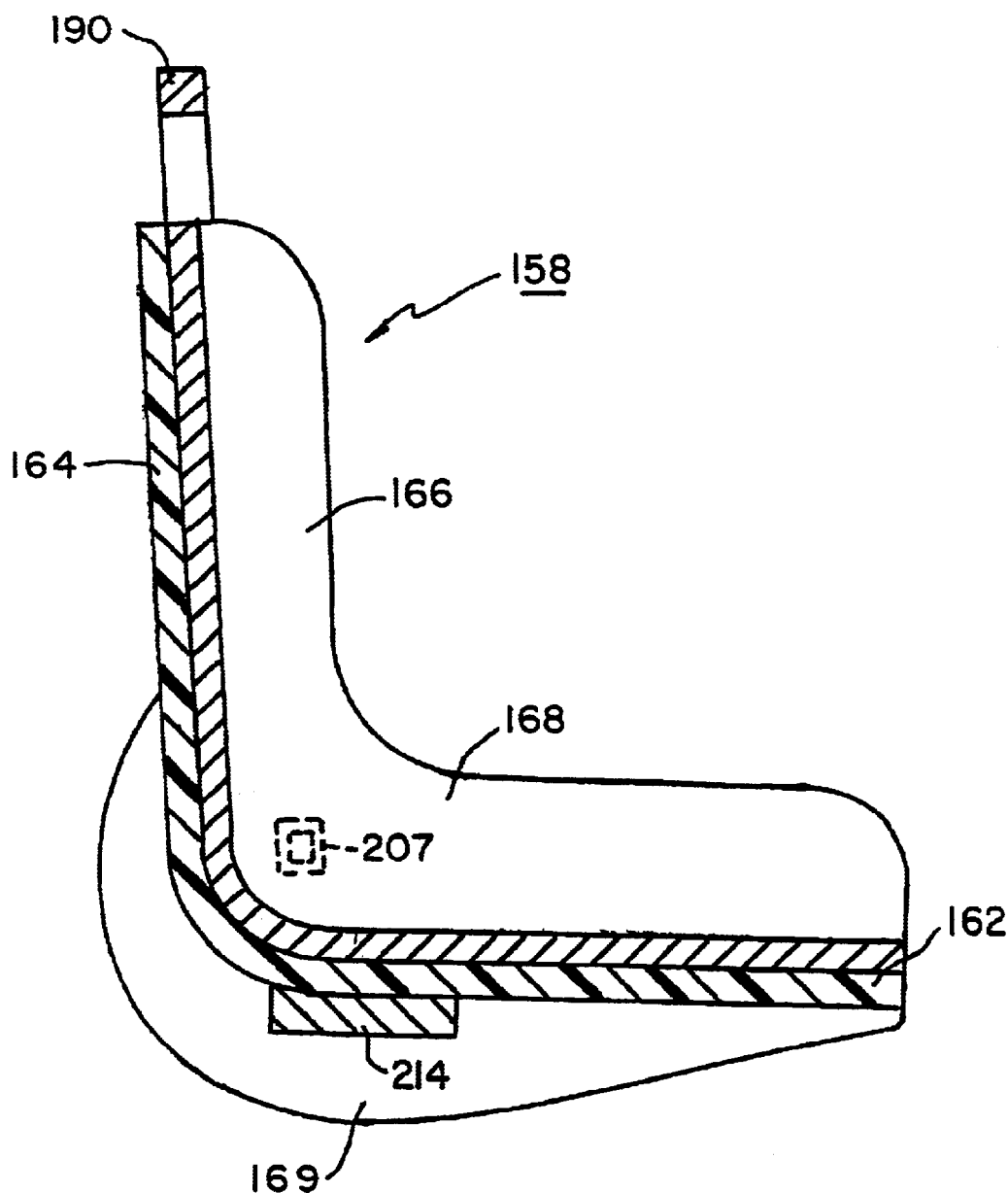
FIG. 21 is a side sectional view taken through plane 21—21 in FIG. 20.

As best seen in FIG. 19, child safety seat 156 shown in isolation includes a rigid molded upright plastic bucket seat, or cradle, 158, and a base member 160 that is removably connected to cradle 158. Cradle 160 includes a generally horizontal cradle bottom wall 162, a cradle back wall 164 connected to bottom wall 162, opposed cradle upper side walls 166 transversely connected to the sides of back wall 164 and opposed cradle lower side walls 168 continuously connected to upper side walls 166 and which are transversely connected to and extend upwardly from bottom wall 162 in a generally horizontal direction along bottom wall 162. Cradle back wall 164 is slightly tilted rearwardly from the vertical. A pair of opposed cradle arced bottom flanges 169 seen in FIGS. 20 and 21 are connected to cradle bottom wall 162. Typical floatable child safety seat 156 also includes a cushion 170 that is contoured to fit over cradle 158 for protecting an infant or child seated in cradle 158 from injury in combination with cradle 158 in the event of sudden movement or collision. Child safety seat 156 protects a young child or infant from sudden movement both in an automotive and in a marine environment.

Figure 22:
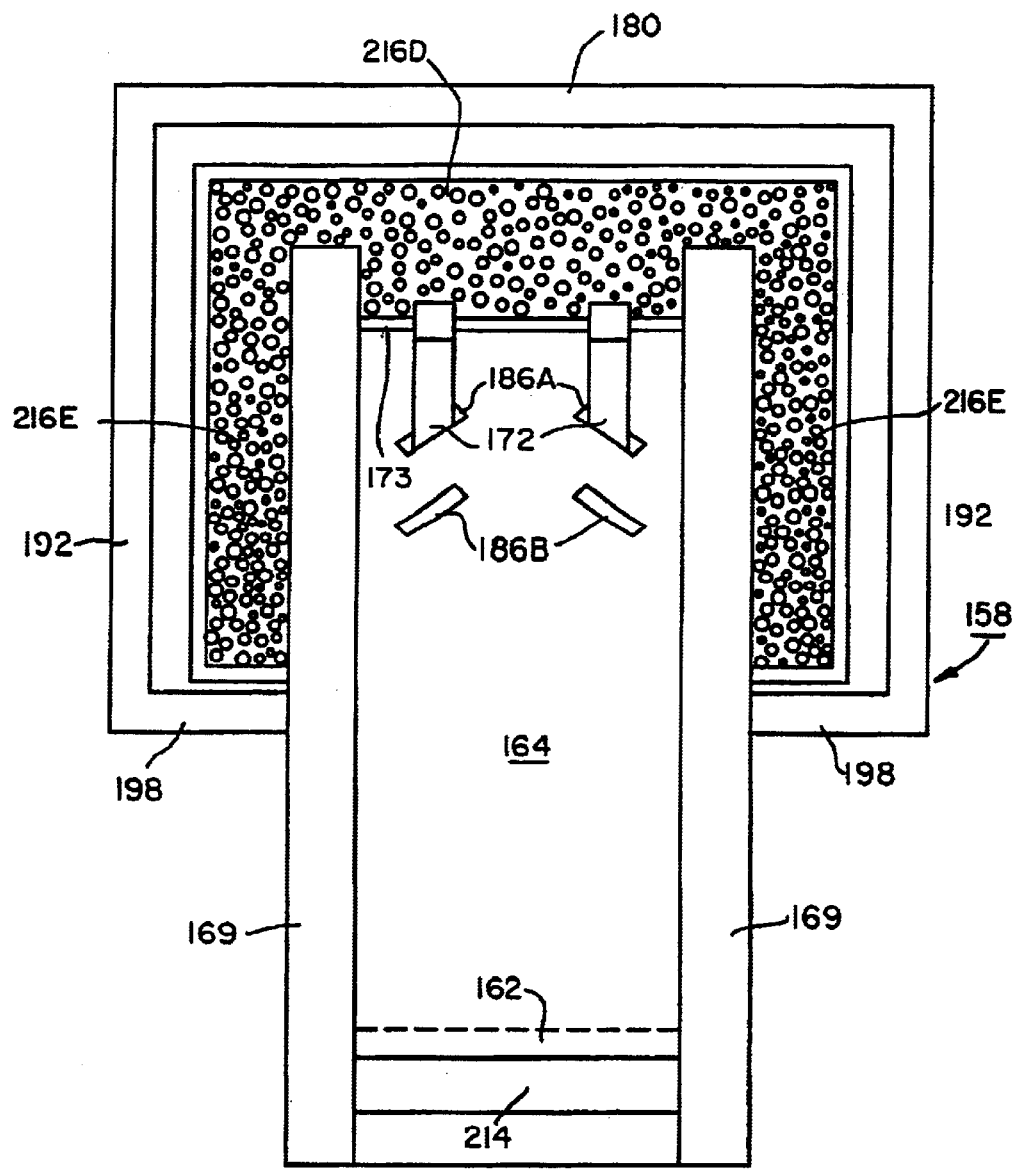
FIG. 22 is a rear elevational view taken through plane 22 taken through plane 22—22 in FIG. 21.
Figure 23:
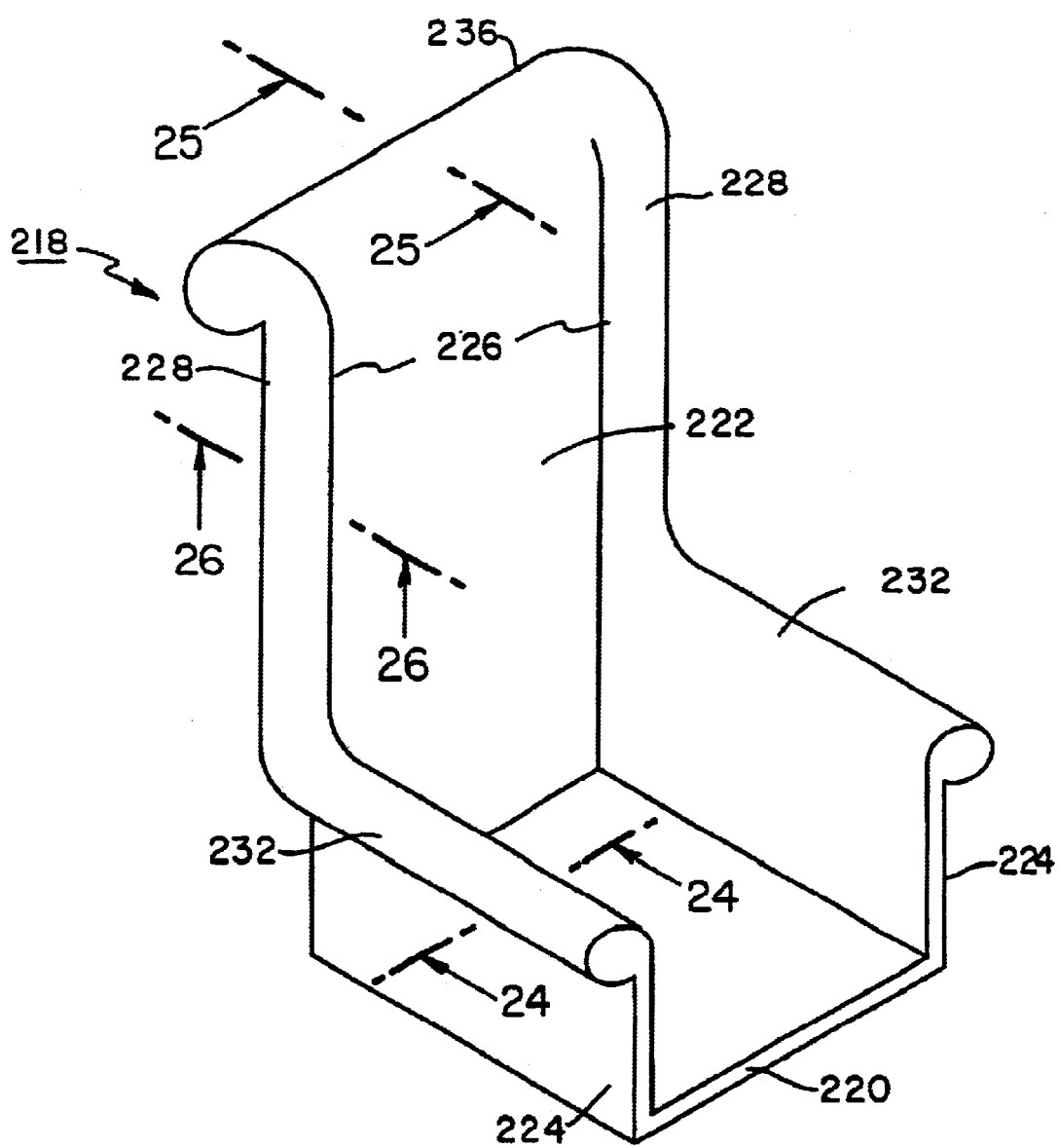
FIG. 23 is a perspective view of a cradle seat with floatation cylinders.
Figures 24, 25:
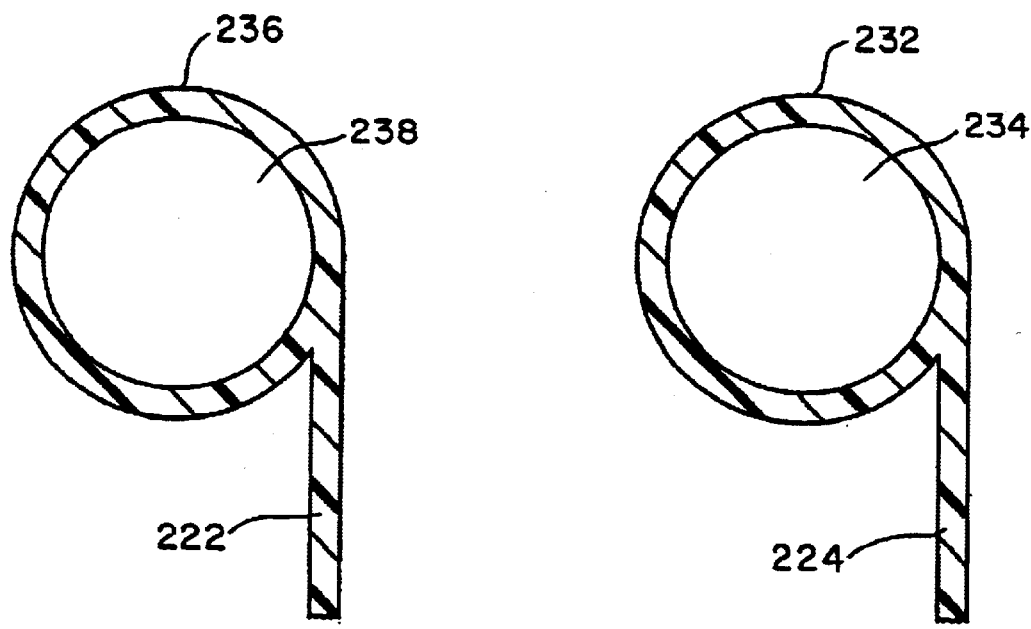
FIG. 24 is a sectional view of a floatation cylinder taken through plane 24—24 of FIG. 23.
FIG. 25 is a sectional view of a floatation cylinder taken through plane 25—25 of FIG. 23.

As shown in FIG. 18, child safety seat 156 includes a pair of shoulder straps 172 to be secured over the shoulders of the child or infant seated in cradle 158. Shoulder straps 172 are adjustably joined at an strap clip 174 from where straps 172 continue downwardly as strap crotch holders 176 to a snap-on clip 178 that is removably mountable to a clip holder 180 seen in FIG. 19 that is accessible through an aperture 182 in cushion 170 seen in FIG. 18. Shoulder straps 172 pass through one of a pair of upper apertures 186A defined in cradle back wall 164 as seen in FIG. 19. A pair of lower apertures 186B located below upper access apertures 186A for an alternate strap adjustment. Shoulder straps 172 continue down the rear surface of cradle back wall 164 and are connected to a cross-bar 173 mounted to the upper portion of cradle back wall 164 as seen in FIG. 22. Upper and lower access apertures 188A and 188B defined at the rear of cushion 170 provide access for shoulder straps 172 to upper and lower apertures 186a and 186B.

A cradle handle 190 includes a pair of upright handle arms 192 joined at the upper ends by a horizontal handle grip 194. The lower arm ends 196 are rotatably mounted to cradle upper side walls 166 at transverse shafts 198. Cradle handle 190 allows cradle 158 to be lifted from cradle base member 160 and transported with or without a child or infant seated in cradle 158. Cradle handle 190 is rotatable forwardly as seen in FIG. 19 as cradle handle 190A shown in partial view in phantom line. Release buttons 198 are located at both shafts 198 that when pressed inwardly, cradle handle 190 is released from a locking mechanism (not shown) of a kind known in the art mounted in base member 160 so that handle 190 can be rotated to either an upper position or a lower position where handle 190 is automatically locked at the new position by the locking mechanism.

As seen in FIGS. 18–22, base member 160 defines a planar bottom surface 202 seen in FIG. 18 that extends between opposed upright base member side walls 203 that is compatible with placing floatable child safety seat 156 either on the seat of a motor vehicle or on the deck of a water craft or on a seat in the cabin of an aircraft all indicated as surface 204 in FIG. 18. Removable cradle 158 is releasably secured to base member 160 by a pair of inwardly extending spring-biased tabs 206 (one of which is shown on FIGS. 19, 20 and 21) removably secured in a pair of locking pockets 207. Tabs 206 are connected to the inner surfaces of base member side walls 203, and locking pockets are positioned on the inner sides of opposed upstanding cradle lower side walls 168. Tabs 206 are drawn inward by operation of a pull handle 208 mounted at front wall 209 connected to a slidable pull mechanism 210 of a type known in the art (indicated generally in dashed line in FIG. 20) located under base member 160 as generally indicated in dashed line in FIG. 20. Operation of pull handle 208 connected to a attached to pull mechanism 210 that in turn draws a pair of bands connected to pulleys (neither shown) operatively connected to tabs 206 so as to drag tabs 206 inwardly out of locked retention in locking pockets 207 into a biased mode. Cradle 158 is then in a free mode to be separated from base member 160 by lifting cradle handle 190. Tabs 206 self-bias back into their original position. Tabs 206 are tapered so that the during return of cradle 158 to its locked position relative to base member 160, a portion of cradle 158 presses tabs 206 inwardly into a biased mode in a manner known in the art until cradle 158 is fully settled into base member 160 at which position holding grips 206 are free to be self-biased back into a non-biased locking mode relative to cradle 158. Other suitable locking mechanisms known in the art can be used to releasably connect cradle 158 to base member 160.

Child safety seat 156 is designed to be placed in a motor vehicle with the child or infant therein in a rear facing position. Child safety seat 156 is secured to surface 204 by a forward securing straps (not shown) passed through a pair of recesses formed by curved grips 212 formed integrally with and extending laterally outwardly from the forward portion of cradle lower side walls 168 and that can receive a transverse securing strap (not shown) extending over cradle 158 and that are in turn are removably secured in a manner known in the art to grips (not shown) associated with the surface 204 of a vehicle, boat or aircraft. Other suitable securing devices known in the art can be used to removably connect base member 160, and thus child safety seat 156, to a vehicle, boat or aircraft.

Ballast 214 is connected to cradle 158 in order to provide cradle with a center of gravity in water, and in particular to provide cradle 158 in water so that an infant or child positioned in cradle 158 that is floating in water is maintained in an upright position. Ballast 214 is shown in FIGS. 21 and 22 as a rectangular structure attached in any suitable manner known in the art to the underside of cradle 158 in particular to the underside of cradle bottom wall 162 at a location at the midportion between cradle lower side walls 168. Ballast 214 generally comprises a non-corrosive material such as a non-corrosive metal such as stainless steel or lead. Ballast 214 preferably comprises a non-corrosive material such a non-corrosive metal such as stainless steel. Ballast 214 can also be such material as lead such as molded lead connected in a manner known in the art to any suitable portion of cradle 158. Lead shot can also be used as a ballast material.

Floatation material referred to generally herein a floatation material 216A–E is secured to various areas of cradle 158 so as to create the buoyancy to float cradle 158 in water in arrangement with ballast 214 so that the head of an infant or child positioned in cradle 158 is maintained above water level in combination with the center of gravity created by ballast 214. Floatation material 216A–E is shown attached to various locations of cradle 158 as shown in FIGS. 19, 20, 21 and 22 as follows: First, floatation material 216A is attached to the inner side of cradle back wall 164. Second, floatation material 216B is attached to the top side of cradle bottom wall 162. Third, floatation material 216C is attached to the inner portions of cradle upper and lower side walls 166 and 168. Fourth, floatation material 216D is attached to the rear side of cradle back wall 164. Fifth, floatation material 216E is attached to the outer side of cradle upper side walls 166. Other floatation material can be attached to suitable areas of cradle 158 in a manner known in the art.

Floatation material 216A–E is a buoyant material, which is preferably a low density material. One such low density material is a closed cell polyurethane. Another such low density material is polystyrene. Various types of buoyant material 216A–E can be used at various locations in accordance with various qualities of the buoyant material. Buoyancy of cradle 158 can be achieved in other ways. For example, buoyancy of cradle 158 can be achieved by molding selected portions of plastic cradle 158 to be hollow and so buoyant. As long as buoyant characteristics of cradle 158 are achieved in arrangement with ballast 214 so as to keep the head of the infant held in cradle 158 above the water line when cradle 158 is in water, the overall inventive aspect of the floatable child safety seat 156 is achieved.

The arrangement of ballast 214 and floatation material 216A–E is to achieve the general results shown in FIG. 11, which indicates various desirable and theoretically achievable positions of floatable cradle 158 in water, for purposes of exposition as fresh water, with various levels of immersion relative to the surface of the water in accordance with the body weight of a child therein and with no child. The exemplary body weights of the children are zero (safety seat being empty), 10 pounds, 20 pounds, 30 pounds, and 40 pounds with associated chin levels of A, B, C, D, and E, respectively, relative to water levels shown as A1, B1, C1, D1, and E1, respectively.

Although the present invention as described in relation to the embodiment shown in FIGS. 12–22 has been described in some detail by way of illustration and example for purposes of clarity and understanding, it will, of course, be understood that various changes and modifications may be made in the form, details, and arrangements of the parts without departing from the scope of the invention. Both floatable child safety seat 84 and floatable child safety seat 156 have been described herein primarily as associated with motor vehicles and water craft, both child safety seat 84 and child safety seat 156 can be used in association with aircraft where both child safety seats would be placed upon a passenger seat of the aircraft in a manner analogous with placing the child safety seats upon the front or rear seat of a motor vehicle. Child safety seat 156 can be secured to the base of a motor vehicle such as a seat of a motor vehicle, to the base of a top deck or underdeck in a marine environment, to a seat in a marine environment such as a motor boat, or to any base in an aircraft enviroment including a floor or a seat therein.

Child safety seat 156 as presently used in motor vehicles includes cradle 158 and base member 160 being locked together in the event of either sudden movement or a shock such as an accident. When child safety seat 156 is secured to the deck of a water craft, or to the seat of a water craft such as a speedboat, it is possible that the person with the infant positioned in cradle 158 would be unable to accomplish the task of freeing the entire child safety seat 156 from attachment to the water craft, generally by removing the securing straps from connection with the securing grips on the water craft. It is particularly advantageous to include a mechanism between cradle 158 and base member 160 that would quickly release cradle 158 from base member 160 upon child safety seat 156 being immersed in water. In particular, the entire pull mechanism 210 that is operable with biasable holding grips 206 would be further integrated with a material that would swell upon immersion with water so that holding grips 206 would be pressed apart into a biased mode so as to free cradle 158 from a locked relationship with base member 160 so that cradle 158 would float free from base member 160 in the water independent of any intervention by a person who had been attendant on the child. Other suitable water-activated release mechanisms associated with freeing cradle 158 from base member 160 are, of course, possible.

A mostly plastic cradle 218 is shown in isolation is shown in FIGS. 23–26 where sealed portions of plastic cradle 218 form buoyant hollow compartments. Cradle 218 is generally analogous to cradles 86 and 158 in that the buoyant compartments shown in FIGS. 23–26 can be used in arrangement with ballasts 146 and 214, for example, to achieve both the buoyancy and the upright characteristics in water necessary to preserve the life of a child strapped in cradles 86 and 158.

Plastic cradle 218 includes a bottom wall 220 connected to a generally upright rear wall 222 and opposed vertical lower side walls 224 connected to bottom wall 220 and rear wall 222 and further including opposed vertical upper side walls 226 connected to rear wall 222 and to lower side walls 224. An opposed pair of generally cylindrical side members 228 are mounted to lower side walls 224 and extend generally horizontally therefrom. A pair of generally cylindrical lower side wall members 228 connected to the upper portions of lower side walls 224 and extending generally horizontal form hollow compartments 230. An opposed pair of generally cylindrical upper side wall members 232 connected to upper side walls 226 and extending generally vertical form hollow compartments 234. A generally cylindrical rear wall member 236 connected to the top of rear wall 222 and extending generally horizontal forms a hollow compartment 238. Hollow compartments 230, 234, and 238 are buoyant in themselves so that, when so sized and arranged in relation to ballast, such as ballasts 146 and 214 of child safety seats 84 and 156, can serve as floatation devices in themselves without the necessity of adding floatation material, such as floatation material 148A–E and 216A–E. Alternatively, floatation material such as floatation material 148A–E and 216A–E can be used in addition to hollow compartments 230, 234, and 238.

Figure 26:
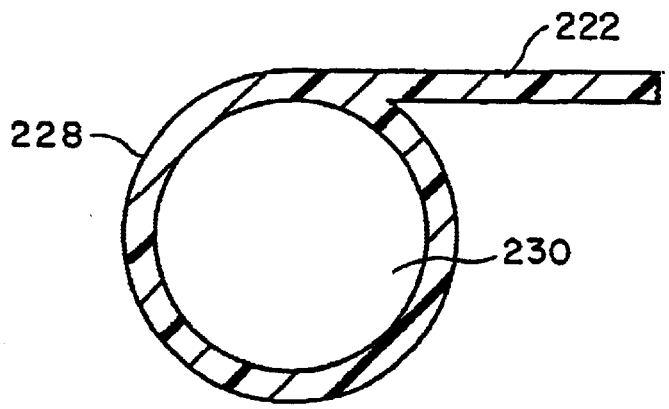
FIG. 26 is a sectional view taken of a floatation cylinder through plane 26—26 of FIG. 23.
Figure 26A:
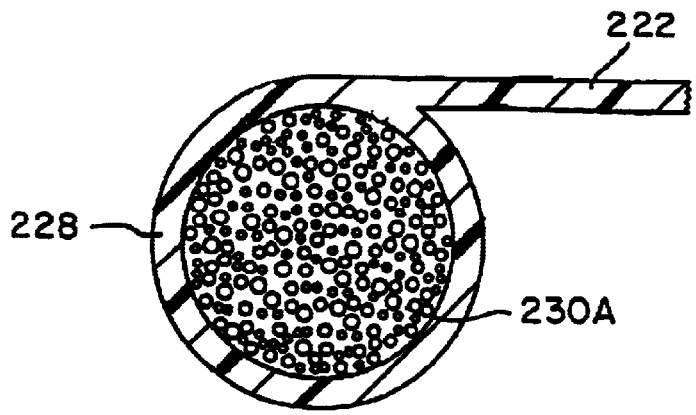
FIG. 26A is the floatation cylinder shown in FIG. 26 filled with floatation material.
Figure 25A:
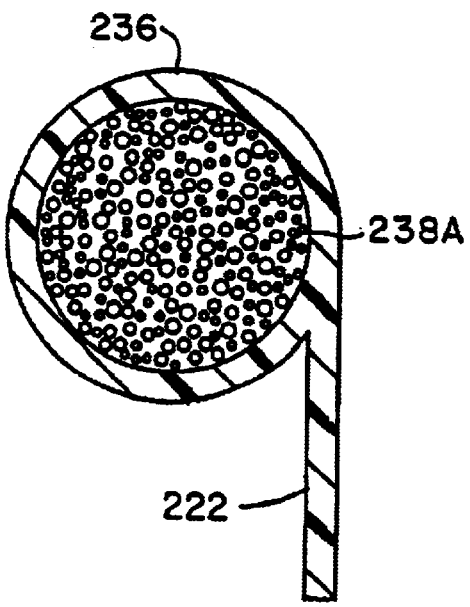
FIG. 25A is the floatation cylinder shown in FIG. 25 filled with floatation material.
Figure 24A:
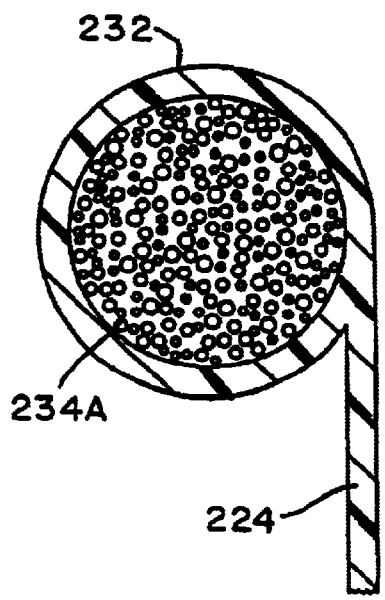
FIG. 24A is the floatation cylinder shown in FIG. 24 filled with floatation material.
Figure 27:
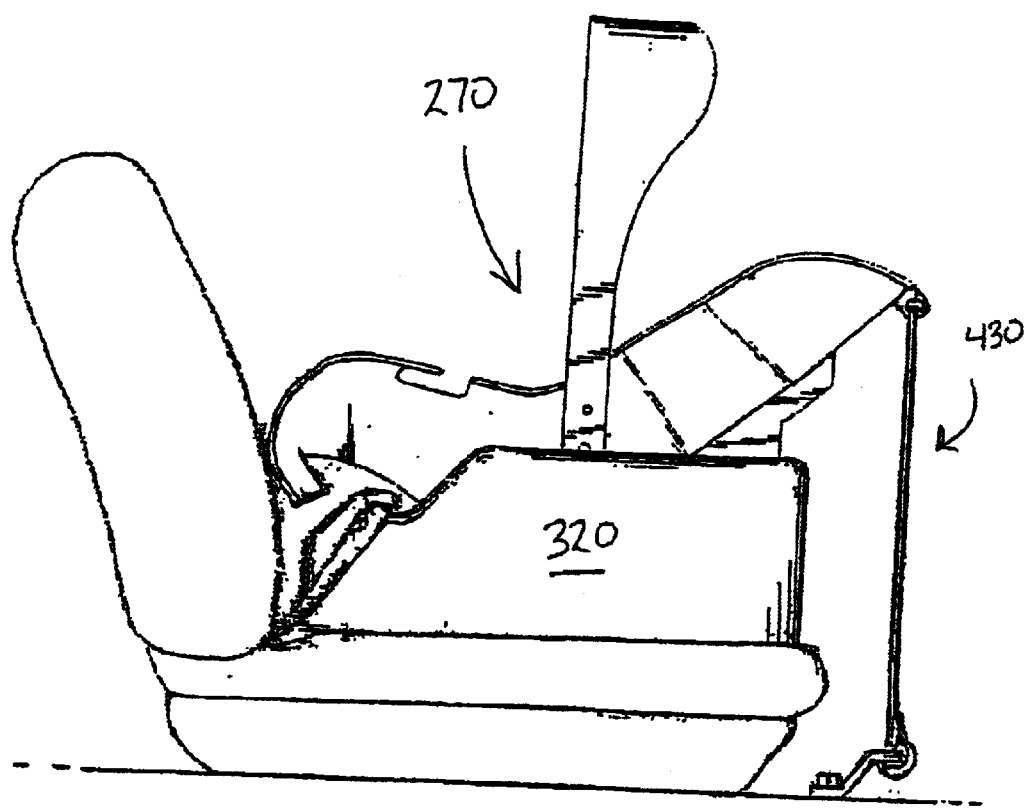
FIG. 27 is a right-side view of a third embodiment of a floatable motor vehicle/boat child safety seat system according to the present invention showing the child safety seat in a rear-facing position.
Figure 28:
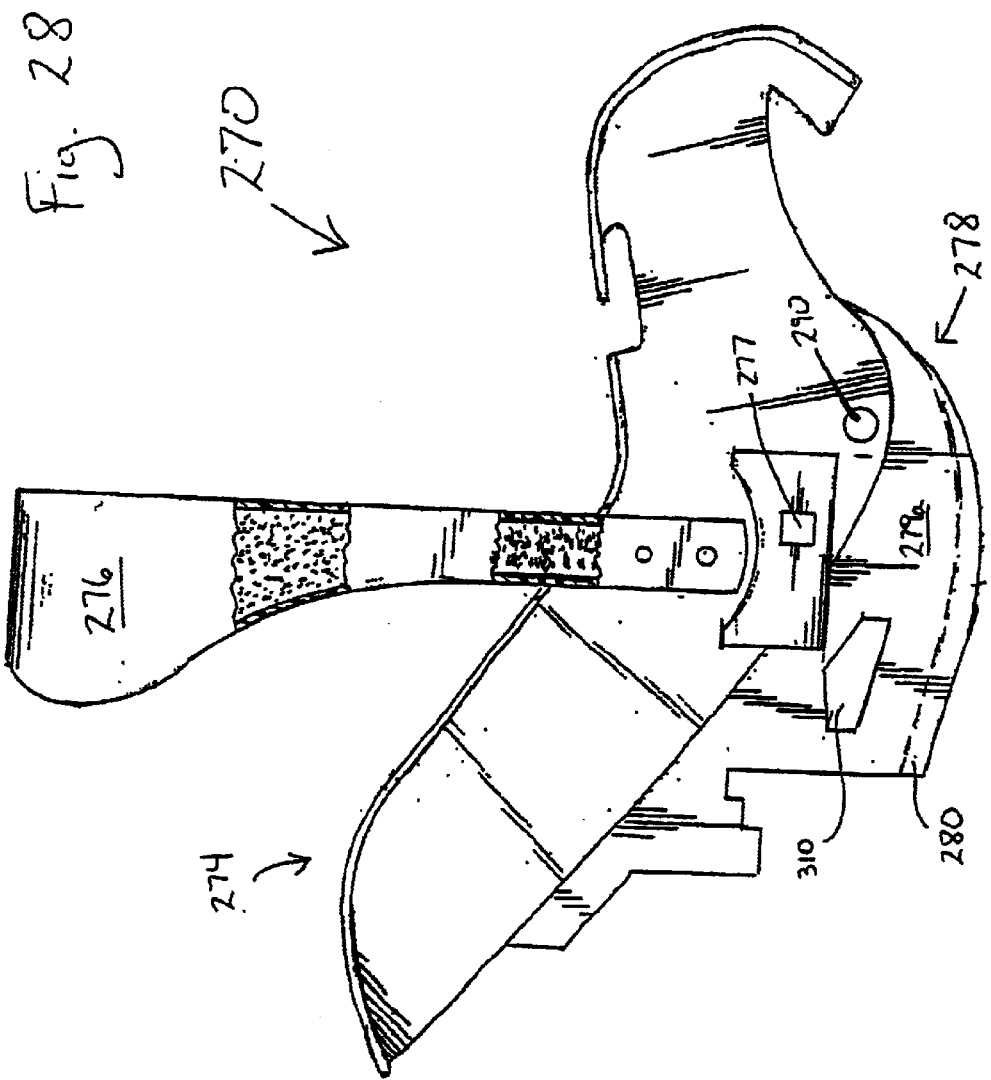
FIG. 28 is a right-side view of the floatable motor vehicle/boat child safety seat of FIG. 27.
Figure 29:
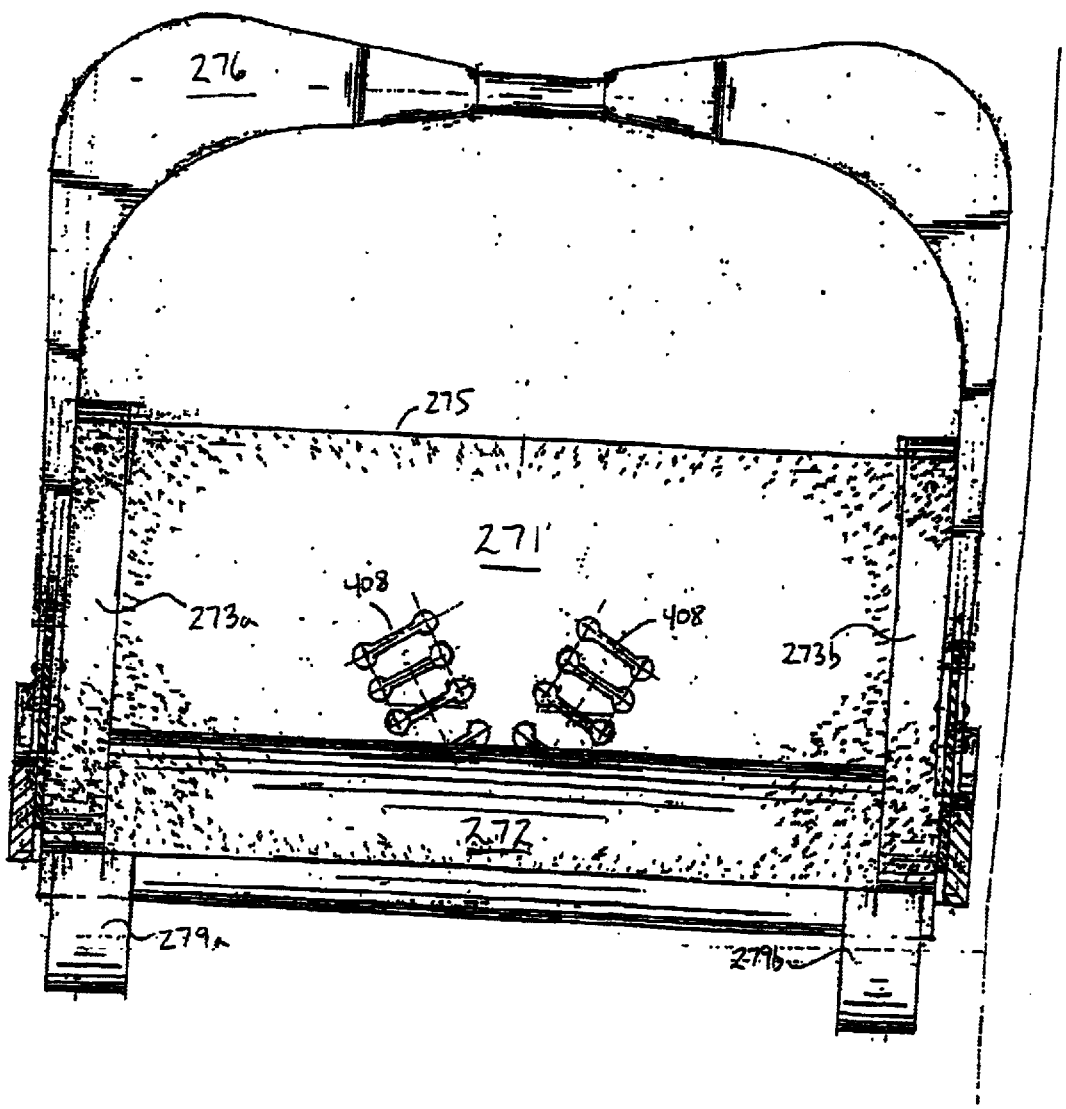
FIG. 29 is a front-side view of the seat of FIG. 27.
Figure 30:
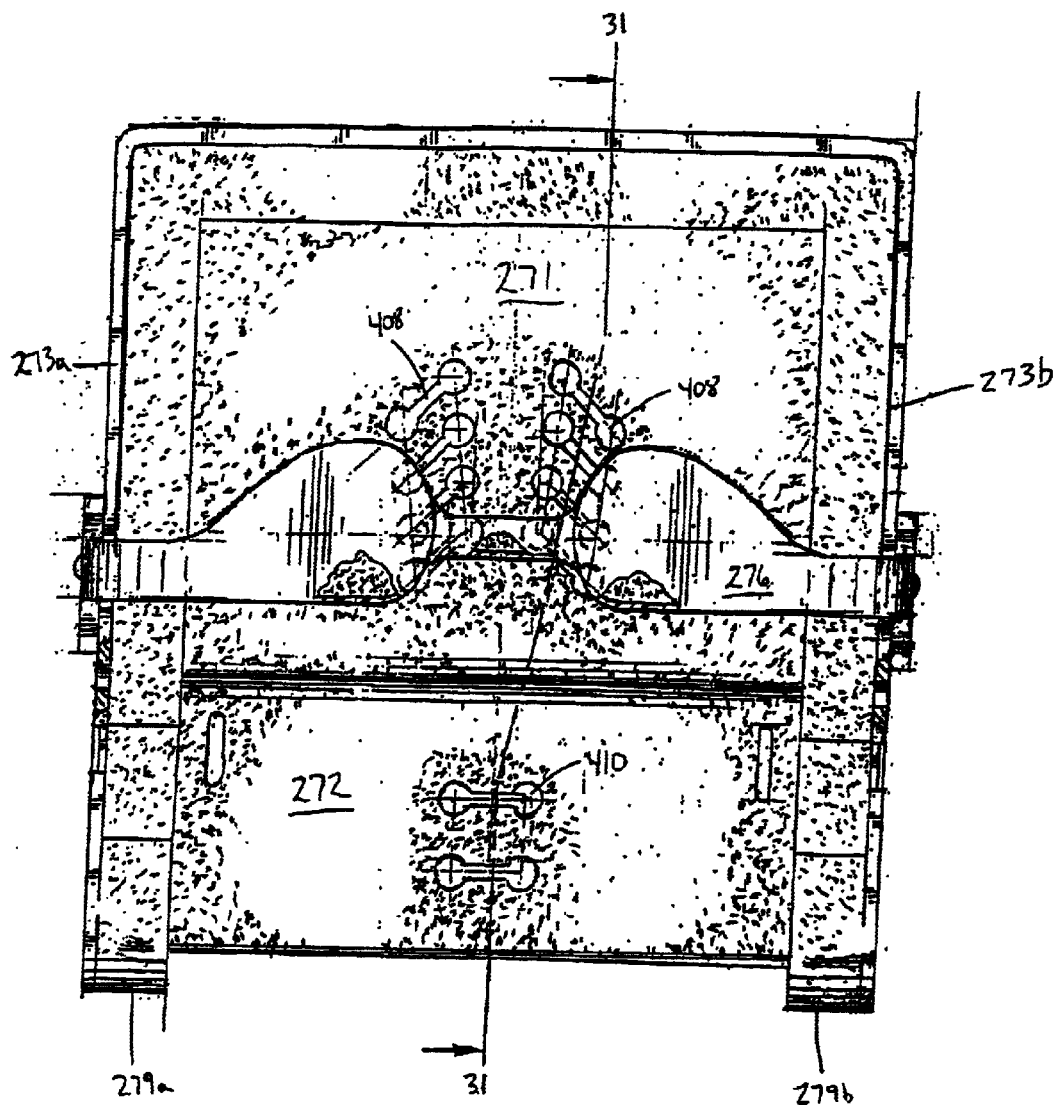
FIG. 30 is a top view of the seat of FIG. 27.
Figure 31:
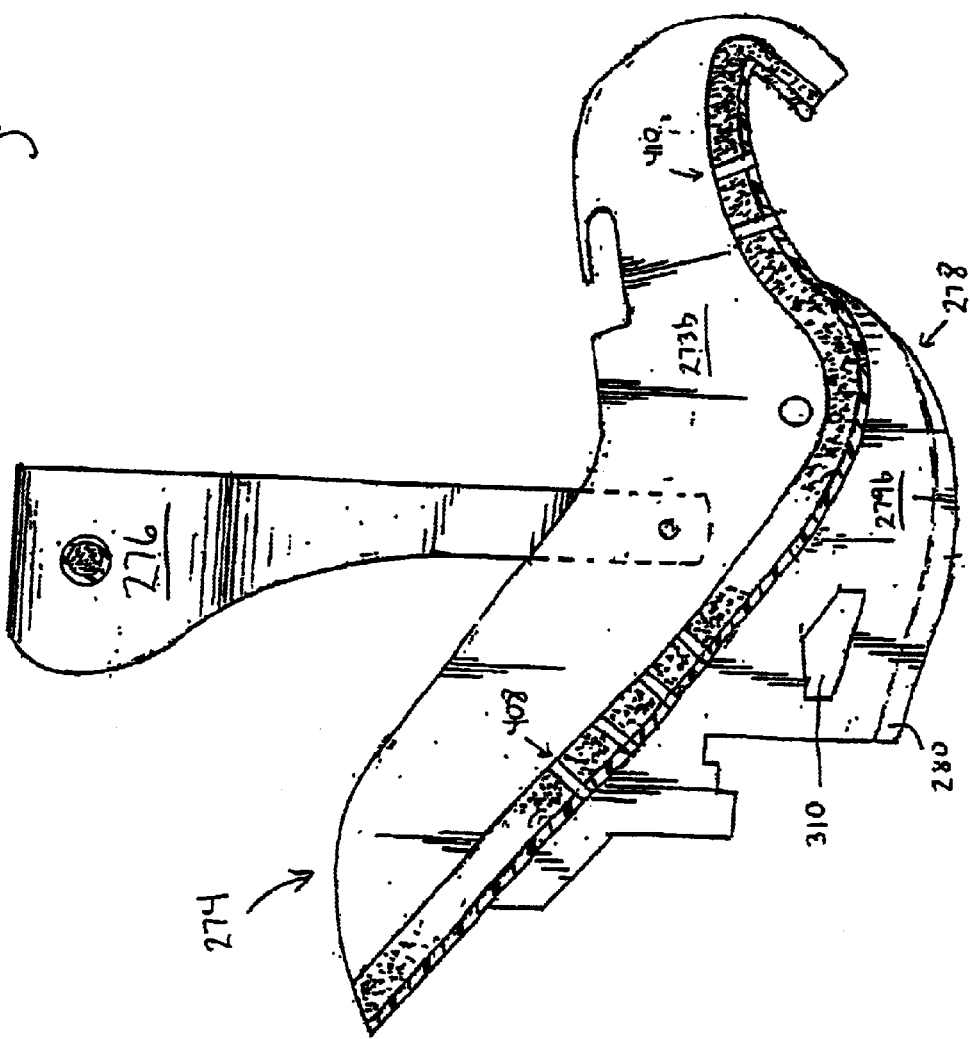
FIG. 31 is a right-side cross-sectional view of the seat of FIG. 27 along line 31—31 of FIG. 29.

FIGS. 24A, 25A, and 26A show compartments 230, 234, and 238 each filled with a floatation material designated as floatation material 230A, 234A and 236A. Such floatation material can be any buoyant floatation material that is water repellent a closed cell polyurethane. Another such low density material is polystyrene. The purpose of floatation material 230A, 234A and 238A is to maintain the buoyancy of compartments 230, 234 and 238 in the event of a break in the plastic enclosure areas so as to allow the entry of water therein.

Figure 37:
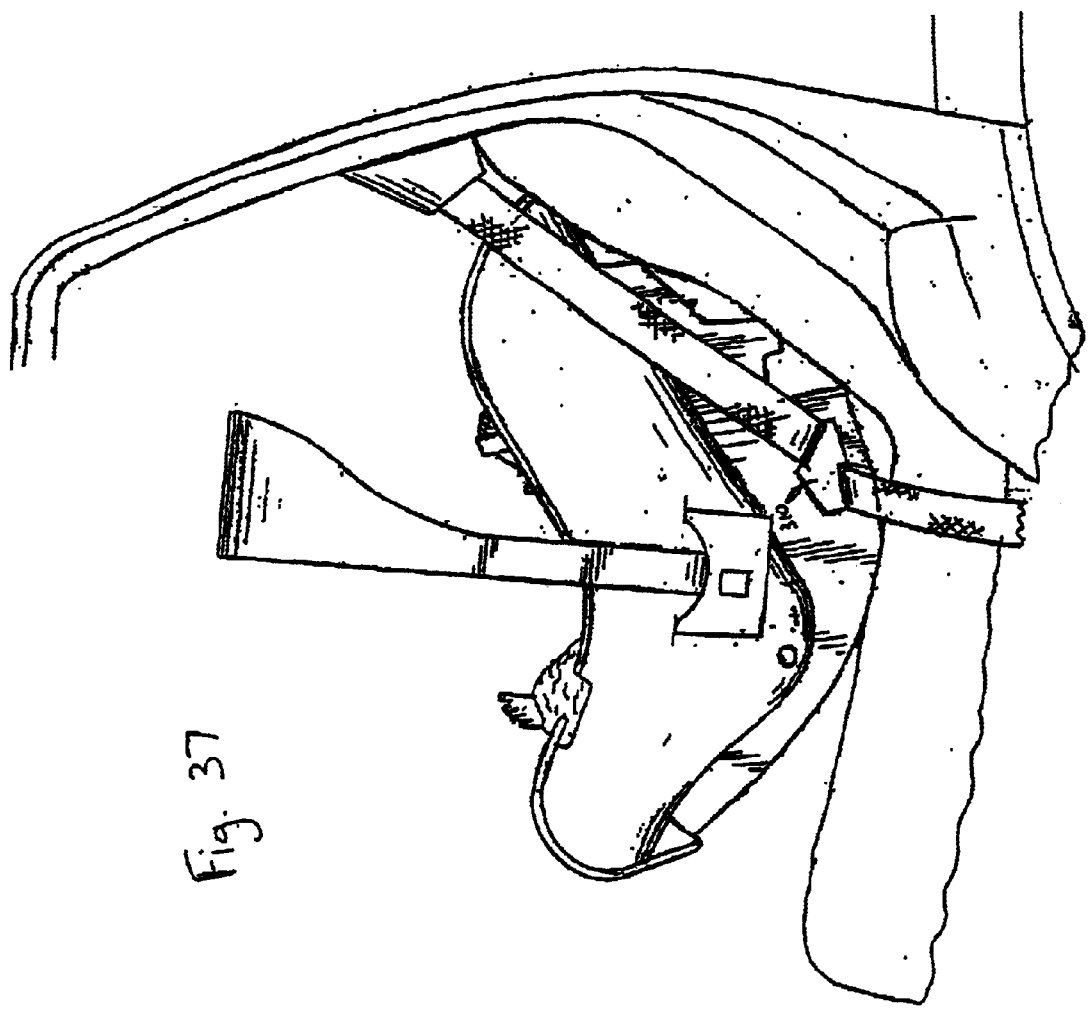
FIG. 37 is a left side view of the seat of FIG. 28 secured in an automobile without the support base.
Figure 38:
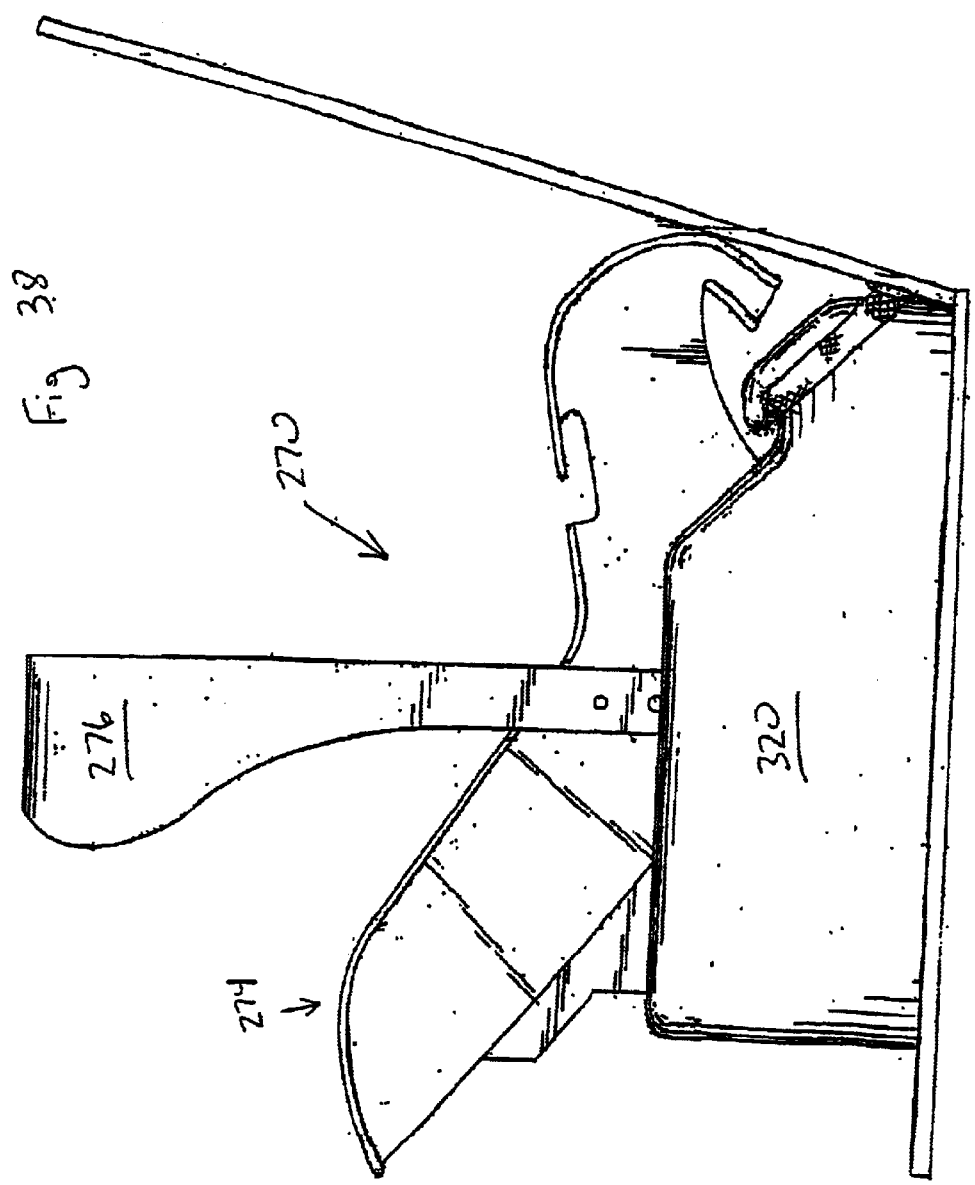
FIG. 38 is a right-side view of the seat of FIG. 28 secured in a base particularly adapted for use in a watercraft.

Referring to FIGS. 27 through 31, there is illustrated another embodiment of child safety seat and seating system according to the present invention, generally indicated as reference number 270. Seat 270 has a bucket seat portion 274, a handle portion 276, and a base portion 278. In addition, bucket seat portion 274 includes a notched segment or aperture 277 that is a part of the releasable latching system, described hereinafter (see FIG. 37 and description, infra.).

Bucket seat portion 274 is the main structural component of seat 270. Bucket seat portion has a seating area comprising a back surface 271 and a seat surface 272. Peripheral side-walls 273a, 273b are on respective side edges of the seating area. Back surface 271 is angled about 90 to 95 degrees relative to seat surface 272. Back surface 271 is about 22 inches long between seat surface 271 and the top edge 275 of bucket seat portion 274. Side-walls 273a, 273b are no less than about four inches high. Side-walls 273a, 273b are higher than those of traditional child safety seats by about 2 inches in order to accommodate about 2 inches of floatation material in the seating area of bucket seat portion 274. In addition, side-walls 273a, 273b extend beyond the edge of seat surface 272 and, thus, form bumper portions 279a, 279b (see FIG. 30) that protect the legs of a child in seat 270 from impacts. Bucket seat portion 274 preferably has drainage holes 290 in order that water caught in bucket seat portion 274 can drain out.

Bucket seat portion 274 is preferably injection molded and constructed of a plastic material that is substantially rigid, partially elastomeric, temperature stable, sunlight resistant, ultraviolet light resistant, and salt resistant. Bucket seat portion 274 should resist cracking and other detrimental changes in physical and/or chemical characteristics when exposed to environmental factors normally present in watercraft.

Handle 276 is also integral to the self-righting capability of seat 270. The self-righting capability is not effected by the height or position from which seat 270 is dropped. Seat 270 will self-right more quickly from higher distances and in more turbulent waters.

Figure 34:
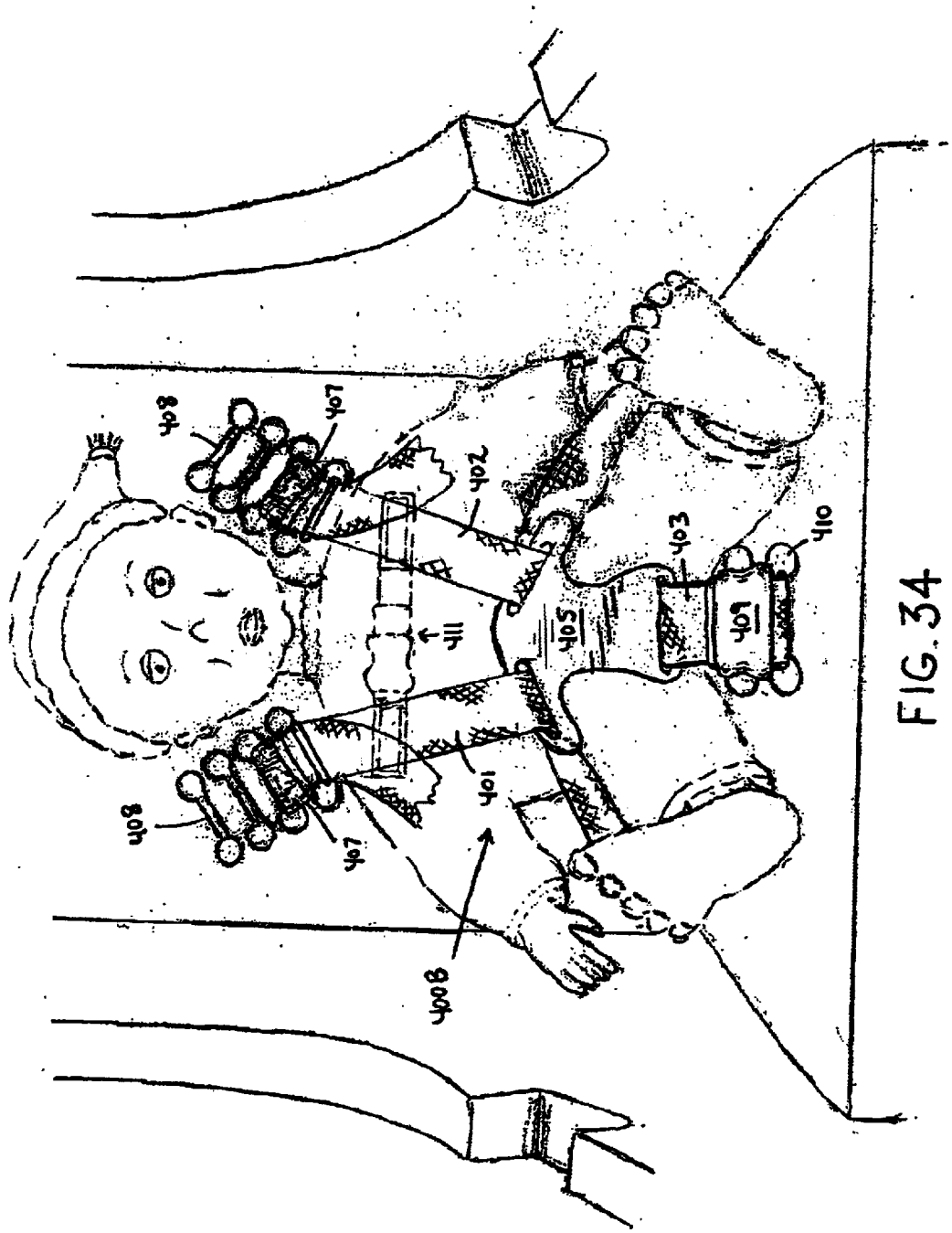
FIG. 34 illustrates the seat of FIG. 28 with an alternative 5-point harness.

In addition, due to its larger horizontal surface area, handle 276 functions as a shock absorber or impact reducer. In case of impact with water, the speed of seat 270 hitting the water is reduced upon impact with the water because the water surface becomes partially displaced by handle 276. When seat 270 is used as a rear-facing car safety seat, handle 276 may act as a bumper guard during a collision to protect a child for impacting with the seat to which seat 270 is secured. If seat 270 is used as a front-facing car seat, handle 270 may help prevent a child from being trapped or injured between the back seats and the front seats, which might become dislodged and forced rearwards in a collision. If seat 270 is used in the front passenger seat (generally not recommended), handle 276 will act as a bumper guard against an air bag hitting the child's face (if seat 270 is facing front) or as a bumper guard against an air bag forcing seat 270 against the back of the front seat to which it is secured. The possibility of these "rebound" injuries is also reduced when seat 270 is tethered to the automobile with a tether assembly 420 (see FIGS. 34a, 34b, and 35).

Moreover, as an aid in rescue at sea, handle 276 provides an easily accessible structure that can be easily grasped by hand, with a boat hook, a gaff, or a similar device. Handle 270 may also be adapted with an emergency locator light, such as an IMO ("International Maritime Organization") or SOLAS ("Safety of Life at Sea") approved emergency locator light. Light reflective material may be built into or cover handle 270. In particular, for Type 1 International IMO and SOLAS approved models, handle 270 and/or the top surfaces of bucket seat portion 274 must be built with or covered by at least 32 square inches of approved light reflective material.

Handle 276 is fixedly attached to bucket seat portion 274 so that, when child safety seat 270 is placed on a level surface, handle 276 has a vertical orientation, i.e., handle 276 is perpendicular to the level surface upon which child safety seat 270 is placed.

Handle 276 has a hollow interior that is filled with suitable floatation material, such as lower density and/or closed celled foam.

Handle 276 is preferably a plastic material that is substantially rigid, partially elastomeric, temperature stable, sunlight resistant, ultraviolet light resistant, and salt resistant. Handle 276 is preferably formed using injection molding techniques. In addition, handle 276 is preferably adapted to be highly visible. For example, handle 276 may be orange colored (particularly "International Orange") or some other easily seen color.

Base portion 278 of seat 270 includes two rocker bars 279a and 279b. Rocker bars 279a, 279b are preferably integrally molded on the underside of bucket seat portion 274. Rocker bars 279a, 279b engage support base 320, as described hereinafter.

Rocker bars 279a, 279b have ballast weights 280 incorporated therein. The ballast weights insure that the majority of the weight of seat 270 is below bucket seat portion 274. Thus, seat 270 has the capability to self-right in the water. Seat 270 has the capability to self-right itself regardless of the orientation in which seat 270 entered the water. The ballast weights may be any appropriate material, shape, and size.

In addition to ballast weights 280, rocker bars 279a, 279b also have flotation material 281 therein sufficient to float seat 270. Preferably, the flotation material provides sufficient buoyancy so that seat 270 floats high in the water with a large proportion of freeboard. When a child is secured in seat 270 and seat 270 is floating in the water, the child is preferably completely or almost completely out of the water. The freeboard helps to keep the child as dry as possible and out of cold water, which will dramatically reduce the effects of hypothermia.

Between the floatation material 281 in rocker bars 279a, 279b and the floatation material in the seating area of bucket seat portion 274, the square inch per pound ration for floatation of seat 270 far surpasses all the requirements of the United States Coast Guard and Underwriters Laboratories. In addition, the floatation material in the seating area of bucket seat portion 274 far surpasses present requirements for automotive child seat padding from the National Highway Traffic Safety Administration.

Figure 32:
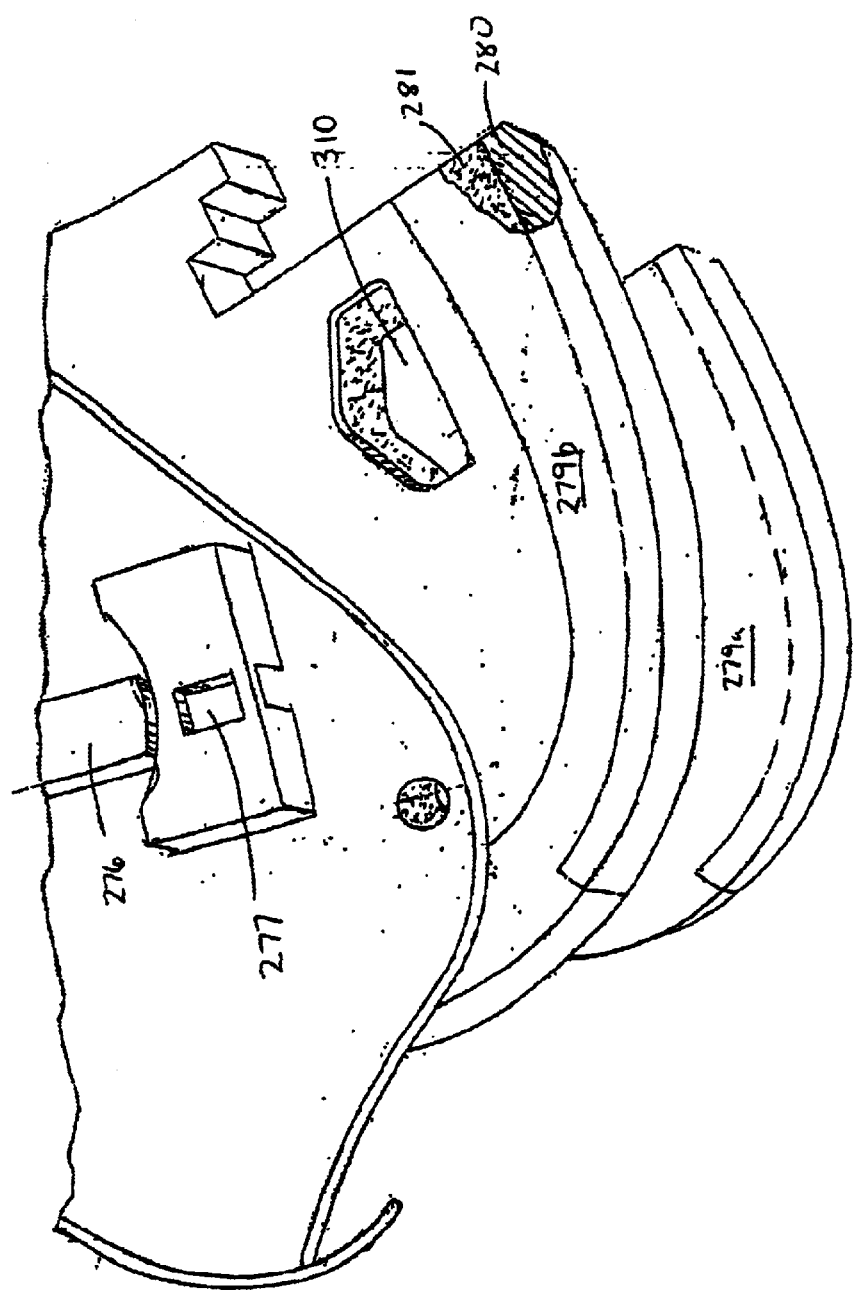
FIG. 32 is a close-up perspective view of the bottom side of the seat of FIG. 27.
Figure 33:
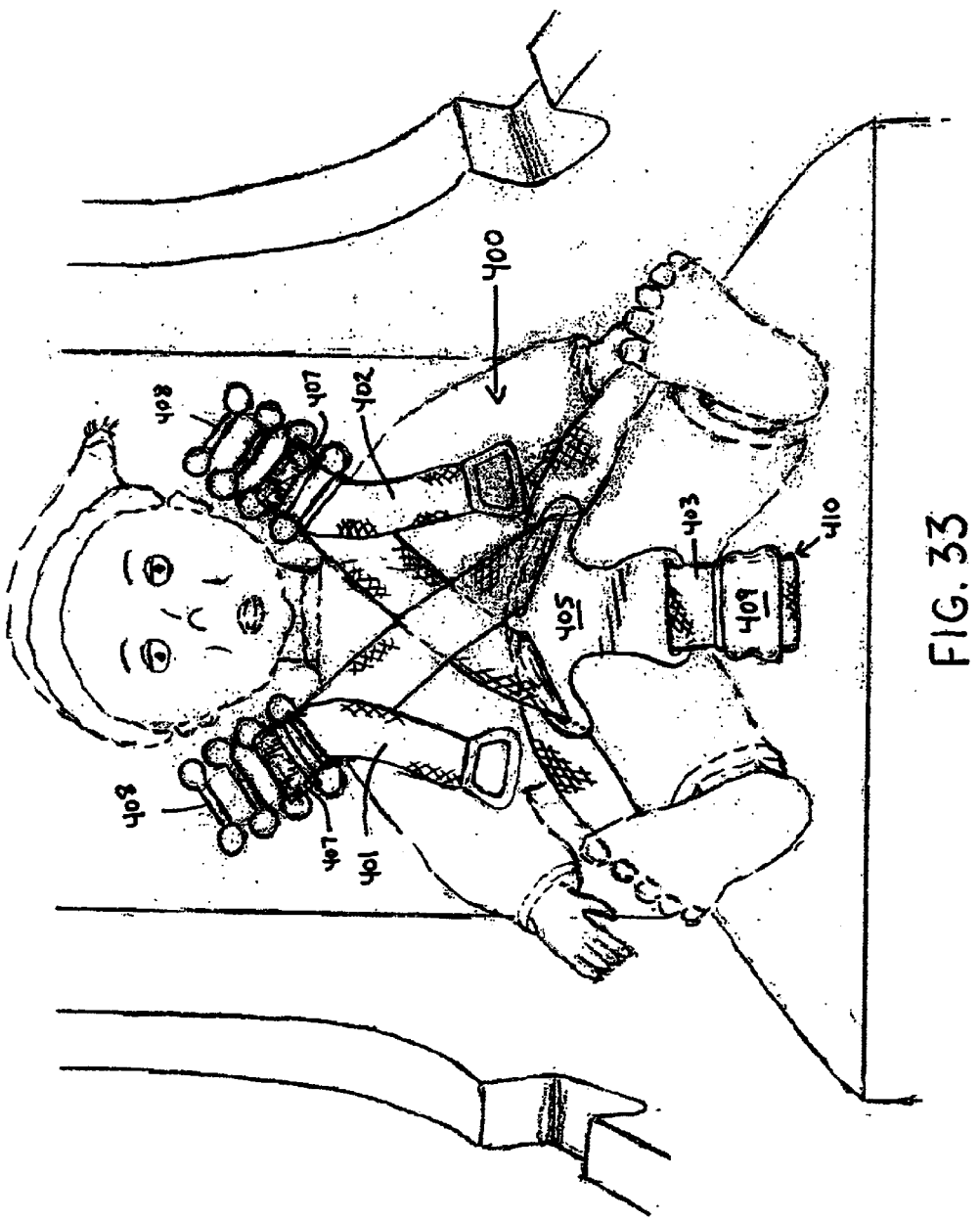
FIG. 33 illustrates the seat of FIG. 28 with a overlapping or "cris-crossed" 5-point harness.

Referring to FIGS. 32 and 33, seat 270 has a harness 400, which is preferably a 5-point harness. Harness 400 has two body straps (401, 402), a crotch strap 403, and a central guide member 405. Each body strap 401 and 402 has a fixed end permanently attached to seat 270 at a position corresponding to the waist of a child in seat 270, and a free end with the tongue or end fitting 407 adapted to be releasably engaged with a latch or buckle 408. When harnessing a child therewith, body straps 401 and 402 initially extend from their fixed ends in a direction substantially towards each other (i.e., horizontally). Body straps 401 and 402 subsequently pass through apertures 406 in central guide member 405 that angle or change the direction of body straps 401 and 402 so that body straps 401 and 402 extend upwardly or vertically, thereby passing over the chest and shoulders of the child in seat 270. In one embodiment, body straps 401 and 402 cross each other, which eliminates the need for a chest buckle 411 (see FIG. 39). Body straps 401 and 402 may be portions of a single elongated strap that wraps around the back of seat 270 and may be secured to seat 270 by any appropriate means, such as a bolt or adhesive. Crotch strap 403 is attached at one end to central guide member 405, and at the other end to seat the seat portion of seat 270 by an end fitting 409, which releasably engages latch 410 that is disposed between the legs of a child in seat 270. A plurality of latches or buckles 408 and 410 are provided in the back portion and seat portion, respectively. The selection of the latch 408 is dependent upon the size of the child in seat 270, wherein, for larger children, a higher and/or wider latch is selected. Thereby, no pre-adjustments of straps 401 and 402 are necessary before use, even if the child to be harnessed has never before been in seat 270.

Referring to FIG. 36, seat 270 has apertures 310 that are used to secure seat 270 in an automobile without using a support base as described in further detail below.

Referring to FIGS. 37 to 42, the system of the present invention is the combination of seat 270 and a support base 320. Support base 320 is fastened to a seat in an automobile, watercraft, or aircraft, using any appropriate means, such as a seat belt or permanent fasteners. Seat 270 is held by support base 320. As shown in the figures, support base 320 is particularly adapted for use in watercraft. Nonetheless, support base 320 may be adapted for use in any type of vehicle. In addition, support base 320 is preferably adapted to be reversible, particularly when used in an automobile or airplane, namely to selectively support seat 270 in the front-facing and rear-facing direction.

The system of the present invention includes a releasable latching system that comprises a latch assembly 381 in the support base, and a notched segment 277 for receiving resilient hook 381, so that seat 270 is snapped into support base 320. Latch assembly 381 comprises a hook 381. Hook 381 is attached to a cam 383 by a bar 382. Cam 383 has a handle 385. Hook 381 is rounded on its upper side to allow seat 270 to easily slide into support base 320. When seat 270 is fully set into support base 320, hook 381 locks into notched segment 277 and prevents seat 270 from being removed. To release seat 270, a user turns handle 385, which rotates cam 383, resulting in hook 381 being pulled out of notched segment 277. In one embodiment of latch assembly 381, the handle must be turn each time a user wants to unlatch seat 270 from support base 320. In an alternative embodiment, the user selectively opens and closes latch assembly 381. The support base for use in watercraft does not include latch assembly 381.

For marine use, support base 320 has no latching system because seat 270 must be free to float out of support base 320 if the watercraft were to sink. Nonetheless, seat 270 must be secure in the horizontal plane. Perferably, support base 320 is adapted such that seat 270 must be lifted about 3 to 4 inches before seat 270 can be moved laterally or sideways or removed from support base 320.

Figure 39:
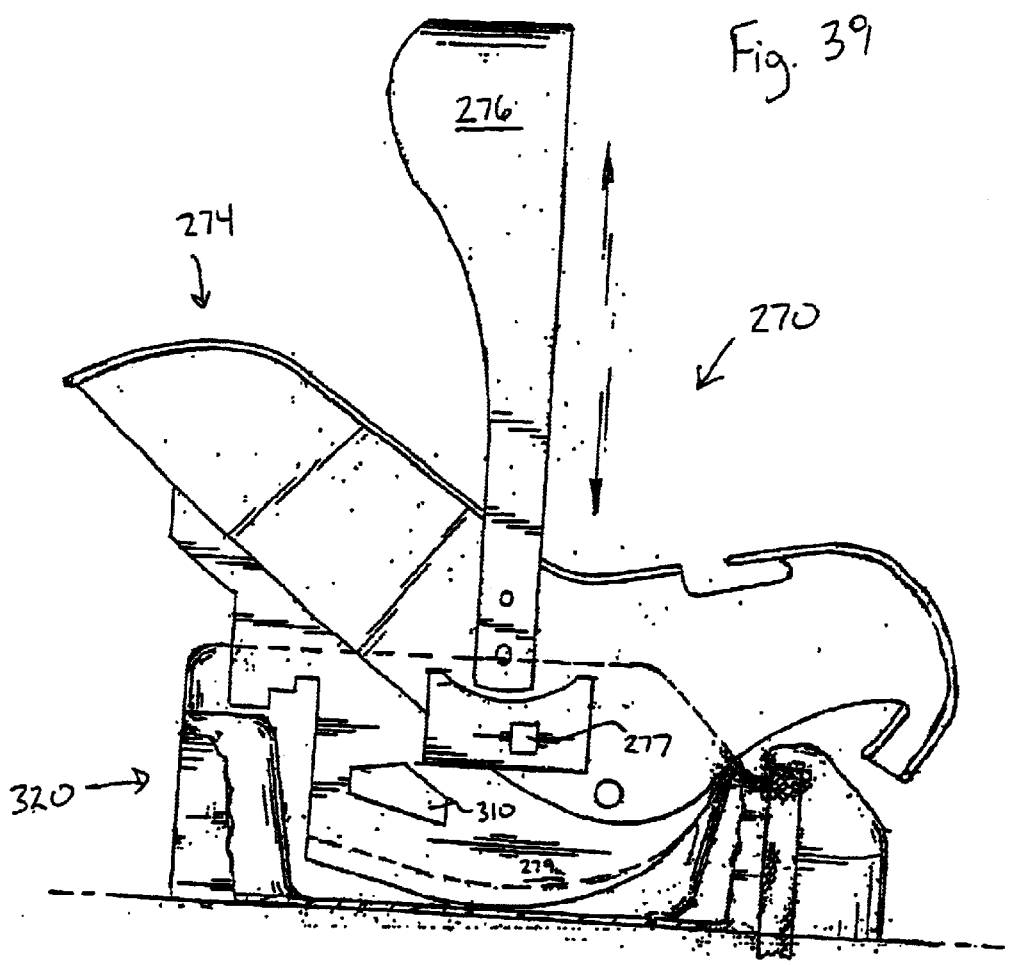
FIG. 39 is a right-side cross-sectional view of the seat and base of FIG. 38.
Figure 40:
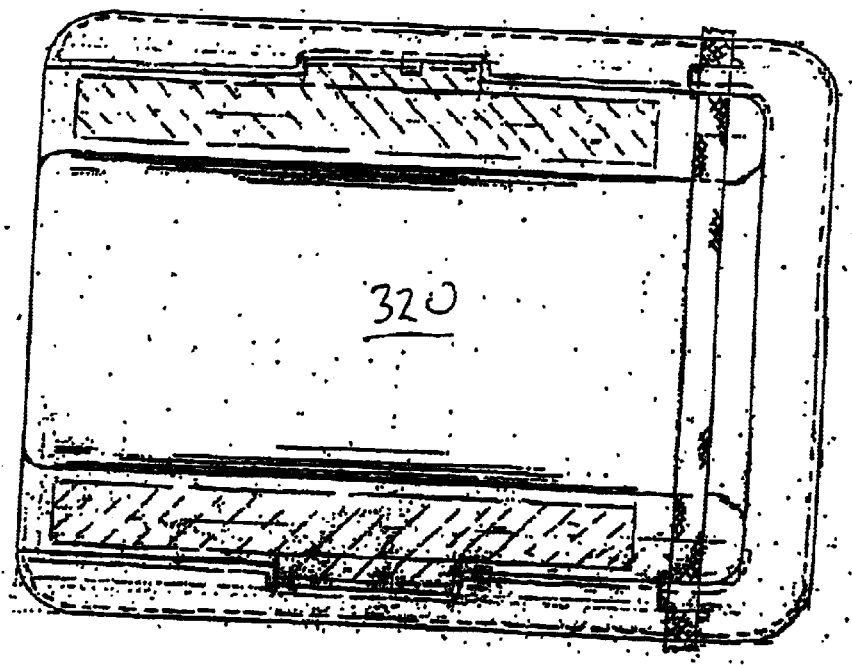
FIG. 40 is a top view of the base of FIG. 38.
Figure 41:
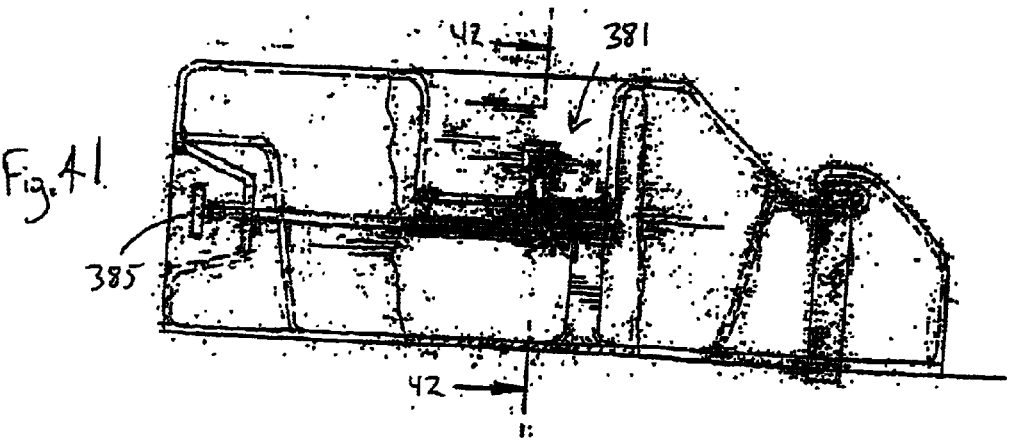
FIG. 41 is a right-side cross-sectional view of the base of FIG. 38.
Figure 42:
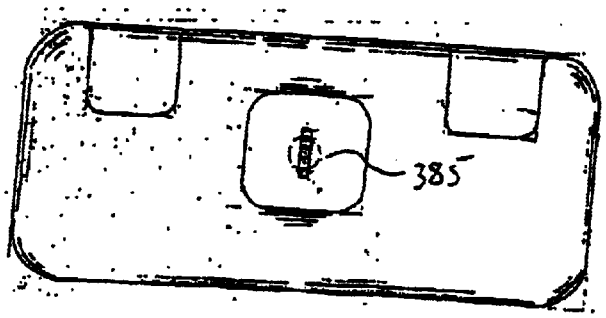
FIG. 42 is a front-side cross-sectional view of the base of FIG. 38 along line 43—43 of FIG. 35.

As stated above, in an emergency, seat 270 must be able to simply float off support base 320 unaided, even if the watercraft is listing at an angle of 10° to 15° or more. Base 278 and notched segment 277 are adapted to engage support base 320 so that seat 270 will freely float up and away from support base 320 when the watercraft is sinking at an angle. In particular, as best illustrated in FIGS. 32 and 39, rocker bars 279a, 279b of seat 270 are suitably tapered so as to enable seat 270 to float out of support base 320. In addition, notched segment 277 is also preferably tapered wherein notched segment is wider at the top and narrower at the bottom. By tapering rocker bars 279a, 279b and notched segment 277, seat 270 retains the capability of floating out of support base 320 in response to a rising water level. The greater the angle of taper of rocker bars 279a, 279b and notched segment 277, the more seat 270 can list while maintaining the capability of floating free of support base 320.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:

1. A child safety seat, comprising, safety seat means for belting to a surface or seat of a motor vehicle, aircraft or boat and for holding a child so that the child is protected from injury in the event of sudden movement in both an automotive environment and a marine or airplane environment including a safety strap for removably holding the child to said safety seat means, said safety seat means including a cradle and a base member removably secured to said cradle, said base member having a planar surface compatible with placing said safety seat means on the surface or seat of a motor vehicle, aircraft, or water craft with said base member belted thereto;

non-corrosive ballast means connected to said safety seat means for providing said cradle with a center of gravity, floatation means secured to said cradle for floating same in water in arrangement with said ballast means so that the head of the child seated in said cradle is maintained above water level in combination with said ballast means, said floatation means including a floatation material made of a closed cell foam buoyant material, and said floatation material being arranged in relation with said ballast means so as to automatically self-right and maintain said center of gravity in water, side arm bar means including side support bars oriented lateral to said cradle of said safety seat means and cross bar means oriented transverse to and connected to said side support bars, said floatation means including floatation material supported by at least said cross bar means, and said cradle includes a flat, planer seat bottom wall, a seat back wall connected to said seat bottom wall, and seat side walls connected to and extending vertically from said seat back wall and said seat bottom wall, said floatation material being secured to said seat bottom wall, said seat back wall and said seat side walls, wherein said side arm bar means extend substantially vertically away from said cradle and said cross bar means is spaced apart from said cradle, and wherein said cross bar means is adapted as a handle and as a shock absorber or impact reducer.

2. The child safety seat of claim 1, wherein said cross bar means is adapted to partially displace water in case of impact with water to reduce the speed of said cradle.

3. The child safety seat of claim 1, wherein said cross bar means is adapted to be grasped by hand, with a boat hook, or a gaff.

4. The child safety seat of claim 1, wherein said cross bar means is adapted with an emergency locator light, light reflective material, or a combination thereof.

5. The child safety seat of claim 1, wherein said buoyant material is a low density material.

6. The child safety seat of claim 1, wherein said non-corrosive ballast means is a non-corrosive metal material connected to said cradle.

7. The child safety seat of claim 1, wherein said non-corrosive ballast means is stainless steel.

8. The child safety seat of claim 1, wherein said non-corrosive material is lead.

9. The child safety seat of claim 1, wherein said base member includes means enabling the user to removably secure said safety seat means to a car or air/marine craft seat by use of a seat belt, tether strap, or a combination thereof.

10. A child safety seat, comprising, safety seat means for belting to a seat of a motor vehicle or air/marine craft and for holding a child so that the child is protected from injury in the event of sudden movement in both an automotive environment and an air/marine environment including strap means for removably holding the child to said safety seat means, said safety seat means including a cradle with a flat seat bottom wall, and a base member removably secured to said cradle, said base member having a planar surface compatible with placing said safety seat means on the surface of a seat of a motor vehicle or on the surface of a seat of an air/marine craft with said base member belted to said seat, non-corrosive ballast means connected to said base member for providing said cradle with a center of gravity, and floatation means secured to said cradle for floating same in water in arrangement with said ballast means so that the head of the child seated in said cradle is maintained above water level in combination with said ballast means, said floatation means including a closed cell foam floatation material made of a buoyant material, and said floatation material being arranged with said ballast means so as to readily self right and to maintain said center of gravity in said water, wherein said cradle further includes a seat back wall connected to said flat seat bottom wall, and seat side walls connected to and extending substantially vertically from said seat back wall and said flat seat bottom wall, said floatation material being secured to said flat seat bottom wall, said seat back wall and said seat side walls.

11. The child safety seat of claim 10, further comprising a harness for securing a child within said child safety seat.

12. The child safety seat of claim 11, wherein said harness is a 5-point harness.

13. The child safety seat of claim 11, wherein said harness has two body straps, a crotch strap, and a central guide member, each body strap having a fixed end permanently attached to said child safety seat at a position corresponding to the waist of a child in said child safety seat, and a free end with an end fitting adapted to be releasably engaged with a respective latch in said seat back wall or said seat bottom, wherein, when harnessing a child in said child safety seat, said body straps initially extend from their fixed ends in a direction substantially towards each other and subsequently pass through apertures in said central guide member that change the direction of said body straps so that said body straps extend vertically and pass over the chest and shoulders of the child in said child safety seat.

14. The child safety seat of claim 13, wherein said body straps cross each other, thereby eliminating the need for a chest buckle.

15. The child safety seat of claim 11, wherein said crotch strap is adapted to be releasably attached to the seat bottom wall.

* * * * *